(12) United States Patent
Kout et al.

(10) Patent No.: US 12,456,946 B2
(45) Date of Patent: Oct. 28, 2025

(54) SPATIAL STRUCTURE OF A PHOTOVOLTAIC MODULE OR A CONCENTRATOR OF SOLAR RADIATION

(71) Applicant: MARP invention s.r.o., Porici (CZ)

(72) Inventors: Milan Kout, Oblanov (CZ); Radovan Spunda, Porici (CZ)

(73) Assignee: MARP invention s.r.o., Porici (CZ)

( * ) Notice: Subject to any disclaimer, the term of this patent is extended or adjusted under 35 U.S.C. 154(b) by 225 days.

(21) Appl. No.: 18/253,284

(22) PCT Filed: Nov. 16, 2021

(86) PCT No.: PCT/CZ2021/050135
§ 371 (c)(1),
(2) Date: May 17, 2023

(87) PCT Pub. No.: WO2022/105951
PCT Pub. Date: May 27, 2022

(65) Prior Publication Data
US 2024/0022208 A1  Jan. 18, 2024

(30) Foreign Application Priority Data

Nov. 18, 2020 (CZ) ................................ CZ2020-617
Nov. 16, 2021 (CZ) ................................ CZ2021-522

(51) Int. Cl.
*H02S 40/22* (2014.01)
*F24S 23/00* (2018.01)
(Continued)

(52) U.S. Cl.
CPC .............. *H02S 40/22* (2014.12); *F24S 23/10* (2018.05); *F24S 23/12* (2018.05); *F24S 23/30* (2018.05);
(Continued)

(58) Field of Classification Search
CPC . H02S 40/22; F24S 23/10; F24S 23/12; F24S 23/30; F24S 23/31; F24S 23/75; F24S 23/82; H10F 77/40–496; H10F 77/70
See application file for complete search history.

(56) References Cited

U.S. PATENT DOCUMENTS

| 4,149,525 A * | 4/1979 | Prado ...................... F24S 10/40 126/654 |
| 2004/0246605 A1* | 12/2004 | Stiles ................. G02B 19/0028 359/857 |

(Continued)

FOREIGN PATENT DOCUMENTS

| CN | 108 767 021 A | 11/2018 |
| CZ | 2009-673 | 4/2011 |

(Continued)

OTHER PUBLICATIONS

PCT Search Report and Written Opinion, March 2. 2022.
CZ Search Report, Jun. 2, 2021.
CZ Search Report, May 26, 2022.

*Primary Examiner* — Lindsey A Buck
(74) *Attorney, Agent, or Firm* — Dority & Manning, P.A.

(57) ABSTRACT

A spatial structure of a photovoltaic module or of a concentrator of solar radiation includes a base body having an upper truncated pyramid or cone arranged on a lower truncated pyramid or cone. An area of a bottom base of the upper truncated pyramid or cone is smaller than an area of a top base of the lower truncated pyramid or cone. An inclination angle of the lower and upper truncated pyramid or cone is in a range of 60 to 85°. At least one pyramid-shaped or cone-shaped concentration projection is arranged on one or both of: the top base of the lower truncated pyramid or cone or a top base of the upper truncated pyramid or cone, wherein the inclination angle of the concentration projection is in a range of 20 to 55°.

14 Claims, 17 Drawing Sheets

(51) Int. Cl.
  *F24S 23/30* (2018.01)
  *F24S 23/70* (2018.01)
  *F24S 23/75* (2018.01)
  *H10F 77/40* (2025.01)
  *H10F 77/42* (2025.01)
  *H10F 77/70* (2025.01)

(52) U.S. Cl.
  CPC ............... *F24S 23/31* (2018.05); *F24S 23/75* (2018.05); *F24S 23/82* (2018.05); *H10F 77/40* (2025.01); *H10F 77/42* (2025.01); *H10F 77/484* (2025.01); *H10F 77/70* (2025.01)

(56) References Cited

U.S. PATENT DOCUMENTS

| | | |
|---|---|---|
| 2010/0181014 A1 | 7/2010 | Raymond et al. |
| 2014/0251413 A1 | 9/2014 | Parras et al. |
| 2015/0083193 A1 | 3/2015 | Ueda |
| 2017/0236953 A1 | 8/2017 | Dutta |

FOREIGN PATENT DOCUMENTS

| | | |
|---|---|---|
| CZ | 2020-617 A3 | 5/2022 |
| EP | 2 687 877 A1 | 1/2014 |
| WO | WO 2010/099620 A1 | 9/2010 |
| WO | WO 2011/098212 A2 | 8/2011 |
| WO | WO 2012/133973 A1 | 10/2012 |

\* cited by examiner

SPATIAL STRUCTURE OF A PHOTOVOLTAIC MODULE OR A CONCENTRATOR OF SOLAR RADIATION

TECHNICAL FIELD

The invention relates to a spatial structure of a photovoltaic module or a concentrator of solar radiation.

BACKGROUND ART

At present, photovoltaic cells of various types, most often silicon, are used to convert solar energy into electrical energy. These photovoltaic cells have the shape of a planar square plate, typically with dimensions of approx. 100×100 mm to approx. 150×150 mm, and their production has been standardized worldwide to a large extent and widely established. These photovoltaic cells are arranged within photovoltaic modules in regular geometric formations, most often planar, whereby they are electrically connected to each other in series (less commonly in parallel) within these modules—see, e.g., "How do PV panels or PV cells work?", National Lighting Product Informational Program, Lighting Answers, Volume 9 Issue 3, July 2006, FIG. 3 (available at http://www.lrc.rpi.edu/programs/nlpip/lightingAnswers/photovoltaic/04-photovoltaic-panels-work.asp) or Alternative Energy Tutorials, Solar Photovoltaic Panel dated 19 Nov. 2014 (available at http://www.alternative-energy-tutorials.com/sola-power/photovoltaics.html). Since the method of electrical connection of individual photovoltaic cells in a module does not have a significant effect on the performance or efficiency of this module and series connection requires less material and occupies less space, it is currently generally considered to be more advantageous.

The number of photovoltaic cells within a photovoltaic module and the resulting size of the photovoltaic module is usually determined by the location where the photovoltaic module is installed and its dispositions. At present, photovoltaic modules are usually mounted on the roofs of buildings or as autonomous assemblies for photovoltaic power plants on wide open spaces. However, photovoltaic modules assembled in this manner have numerous disadvantages. The main disadvantage is the fact that due to their structure and spatial arrangement, they are substantially able to use only direct sunlight which falls on them in case of clear sky and therefore it is necessary to install them at certain angles and orient them especially to the south. Their disadvantage is that they are not able to capture and use scattered and reflected solar radiation, which makes up most of the solar radiation even with a small degree of cloud cover. Another disadvantage is the considerable fluctuation of the electrical power supplied by them, depending not only on the current level of cloud cover, but also on the temperature and season, which causes problems with the stability of the electrical distribution network.

In addition to the above-mentioned silicon photovoltaic cells, there are also other types of photovoltaic cells, such as thin-film cells based on amorphous silicon or on chalcogenide compounds (CuInSe, CuInSeGa, CdTe etc.), which, due to their physical nature, achieve lower efficiency (and thus also the amount of energy produced) than conventional silicon-based photovoltaic cells. These types of photovoltaic cells usually also have the shape of a square plate with dimensions of approx. 100×100 mm to approx. 150×150 mm.

To increase the amount of photons of solar radiation hitting a unit area of a photovoltaic cell or a module, different types of concentrators of solar energy are used in practice, most often made of reflective materials (mirrors)—see, e.g., Volker Quaschning: "Renewable energy sources", page 96 (ISBN: 9788086726489, Profipress s.r.o., 2012), or in the form of optical lenses. Even with the use of these concentrators, however, it is still true that basically only photons of direct solar radiation are utilized, which, despite light intensity increased by the concentrator, still generate disproportionately little energy in the modules. However, due to the concentrators, the photovoltaic modules overheat, which further reduces the potential energy yield. Moreover, the concentrators, e.g., in the form of mirrors, take up considerable space and increase investment costs and can therefore be only used to a very limited extent.

Nowadays, there is no structure of a photovoltaic module or a concentrator of solar radiation which would be able to capture and use efficiently and quantitatively direct solar radiation and scattered and reflected solar radiation which hits the photovoltaic module or concentrator of solar radiation already with a small degree of cloud cover from very different directions and at different angles.

The objective of the invention is therefore to provide a spatial structure of a photovoltaic module or a concentrator of solar radiation which would enable this.

Principle of the Invention

The objective of the invention is achieved by a spatial structure of a photovoltaic module or a concentrator of solar radiation, whose principle consists in that it contains a base body consisting of at least two truncated pyramids or cones arranged on each other, whereby the area of the bottom base of the upper truncated pyramid or cone is smaller than the area of the top base of the lower truncated pyramid or cone, and the inclination angle of the lower truncated pyramid and the inclination angle of the upper truncated pyramid is in the range of 60 to 85°, whereby at least one concentration projection in the form of a pyramid or cone is arranged on the top base of at least one truncated pyramid or cone of the base body, the inclination angle of the concentration projection being in the range of 20 to 55°.

Preferably, the inclination angle of the lower truncated pyramid or cone and the inclination angle of the upper truncated pyramid or cone is in the range of to 75°.

The bases of the upper truncated pyramid or cone and the bases of the lower truncated pyramid or cone are preferably in the shape of a regular n-sided polygon, n being preferably equal to 3, 4, 6, 8, 12, 16 or infinity.

Preferably, the bases of the concentration projections also have the shape of a regular n-sided polygon., n being preferably equal to 3, 4, 6, 8, 12, 16 or infinity.

In a preferred variant, the base body of the structure is provided with at least one chamfer guided along the entire height of the base body at an angle ranging from 20 to 80°.

In addition to the concentration projections, at least one pyramid-shaped or cone-shaped recess with an inclination angle of 20 to 55° can be arranged on the top base of at least one truncated pyramid or cone of the base body.

In a preferred variant of embodiment, at least two inclined surfaces are arranged on the top base of the upper truncated pyramid or cone, wherein at least one concentration projection is arranged on each of the inclined surfaces. The axes passing through the apexes and the centres of the bases of these concentration projections form an angle $\alpha_{33}$ of 40° to 90°.

The spatial structure according to the invention is preferably made of optically permeable material.

In another variant of embodiment, the structure according to the invention is formed inversely as a cavity in a block of optically permeable material.

In any variant of embodiment, the spatial structure according to the invention can be provided with at least one photovoltaic cell on its surface.

At least one side wall of the upper truncated cone or pyramid and/or at least one side wall of the lower truncated cone or pyramid is preferably formed as broken/angled, wherein a transition surface is formed between its adjoining parts. At least one concentration projection can be arranged on at least one transition surface and/or at least one recess can be formed in it.

For a better spatial arrangement and further concentration of the solar photon paths before they hit the photovoltaic cell, a platform of optically permeable material is located below the bottom base of the lower cone or cone.

EXAMPLES OF EMBODIMENT

Figure 1A:
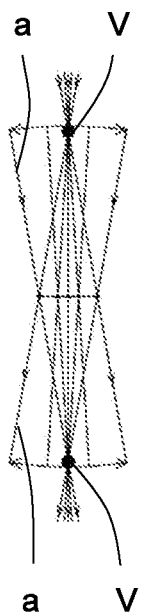
FIG. 1a schematically shows typical paths of solar photons in case of clear to low cloud sky conditions.
Figure 1B:
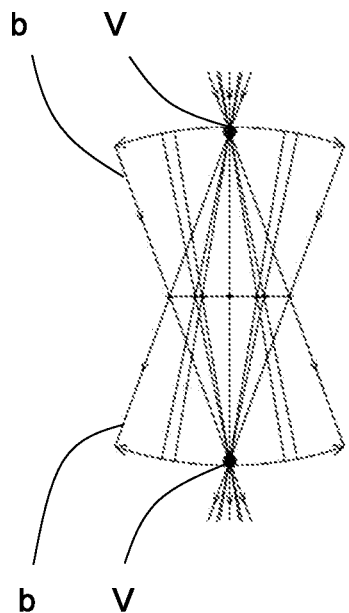
FIG. 1b shows typical paths of solar photons in case of partly cloudy to cloudy skies.
Figure 1C:
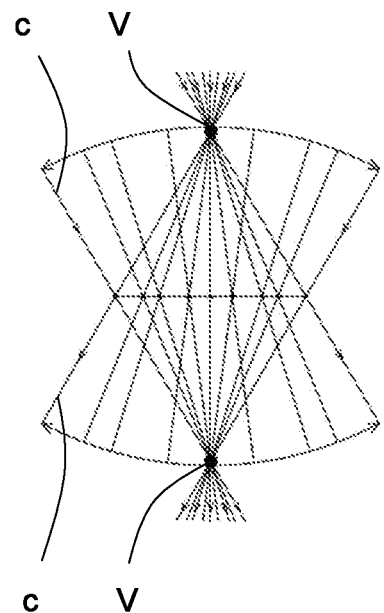
FIG. 1c shows typical paths of solar photons in case of cloudy to overcast skies.
Figure 1D:
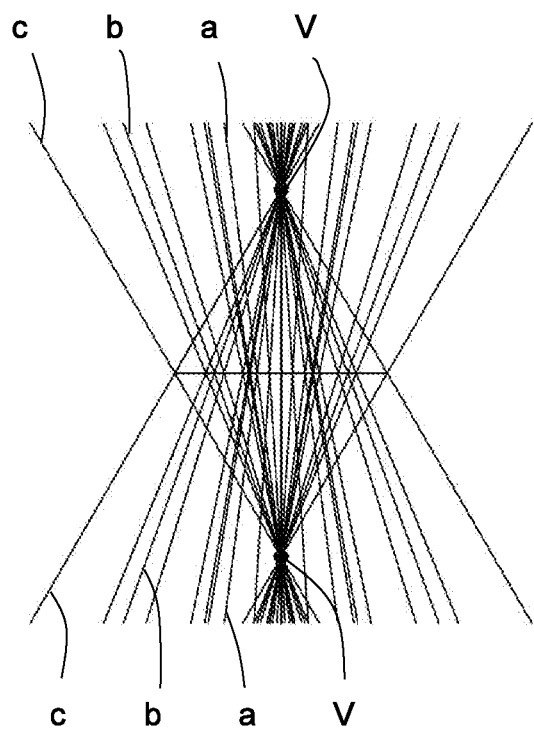
FIG. 1d shows combinations of different paths of solar photons under real conditions, FIG. 2 schematically represents one exemplary embodiment of the structure of a photovoltaic module or a concentrator of solar radiation according to the invention.

Based on the research of the inventors, completely new, hitherto unsuspected paths of photons of solar radiation for various degrees of cloud cover were discovered using real experimental photovoltaic cells and modules and with the support of modern optical and electrical devices. It is a grouping of photon paths into specific cones a, b, c which are formed by a complex network of straight photon paths and which end in specific foci V with specific dimensions and energy intensities. Depending on the degree of cloud cover, and thus also on the resulting type of solar radiation, these cones a, b, c differ from each other in the width and size of the apex angle. The cones a formed by the paths of photons of direct solar radiation have the smallest apex angles, whereas the paths of photons of scattered and reflected solar radiation have the largest apex angles. The smaller the apex angle of the cone a, b, c of paths of the photons, the tighter and denser this network structure, and the more concentrated the energy of the photons at its apex V—see FIG. 1a, which schematically shows typical cones a of the paths of photons of solar radiation for the case of clear to almost clear sky (i.e., the fraction of the sky covered with clouds is not more than approx. 2/8), typically having an apex angle of approx. 20°, FIG. 1b, which schematically shows typical cones b of the paths of photons of solar radiation for the case of low cloud cover (i.e., the fraction of the sky covered with clouds is approx. 3/8) to semi-cloudy sky (i.e., the fraction of the sky covered with clouds is approx. 4/8), which, due to scattering when passing through clouds, usually have an apex angle of about 40°, and FIG. 1c, which schematically represents typical cones c of the paths of photons of solar radiation for the case of cloudy sky (i.e., the fraction of the sky covered with clouds is approx. 5/8) to overcast sky (i.e., the fraction of the sky covered with clouds is approx. 8/8), which, due to a larger degree of scattering and reflection when passing through clouds, typically have an apex angle of approx. 60°. With all these types of cloud cover, solar radiation creates real-time, during daytime and anywhere in the Earth's atmosphere geometrically accurate all-spatial network structures of the same shape formed by cones a, b, c of photons which concentrate in the apexes V of these cones a, b, c and which due to different lengths of the photon paths contain different energy intensities. When conditions change, the directional character of solar radiation striking the Earth's surface also changes. For example, in the case of semi-cloudy sky, a combination of two or more types of photon paths with greater and lesser intensity may occur, where part of the radiant flux comes in the form of direct radiation and part in the form of scattered and/or reflected radiation—see FIG. 1d. Under these conditions, these networks intermingle and, thanks to the same basic shapes, form a spectral, quantum and all-space network of cones a, b, c and their apexes V.

All these photon paths meet at the apexes V of the cones a, b, c and then leave them to meet again at the apexes V of the cones a, b, c originating in the lower part of the atmosphere and into which cones a, b, c of photons with larger or even smaller apex angles can flow on their way to the Earth's surface.

The spatial structure 1 of a photovoltaic module or a concentrator of solar radiation according to the invention, which is schematically represented in different variants in the enclosed drawings, corresponds to this theory and is adapted by its shape to capture (in the case of a photovoltaic module) or to direct in a suitable manner (in the case of a concentrator of solar radiation) the maximum possible number of the paths of photons of solar radiation under any cloud cover. Each of the variants of this structure 1 described below can be used either alone or in combination with the same or similar structures as part of a larger unit within which the individual structures 1 can be arranged on a planar base or in any spatial arrangement—see, e.g., FIGS. 16, 18, 19, 19a, 27 and 29. During real measurements, an increase by tens of percent has been observed in the efficiency of photovoltaic modules whose shape corresponds to the spatial structure 1 according to the invention or photovoltaic modules equipped with solar radiation concentrators whose shape corresponds to the structure 1 according to the invention. The variants of the spatial structures 1 in the attached drawings are only exemplary and the individual structures 1 can be further substantially arbitrarily modified and combined with one another.

The spatial structure 1 of a photovoltaic cell or a concentrator of solar radiation according to the invention comprises a base body 2 consisting of at least two truncated pyramids 20 and 21 arranged on each other. The upper truncated pyramid 21 is arranged with its bottom base 210 on the top base 201 of the lower truncated pyramid 20, preferably in the centre thereof, whereby the area of the bottom base 210 of the upper truncated pyramid 21 is smaller than the area of the top base 201 of the lower truncated pyramid 20. The inclination angle $\alpha_{20}$ of the lower truncated pyramid 20, i.e., the angle between its bottom base 200 and its side walls 2000 and the inclination angle $\alpha_{21}$ of the upper truncated pyramid 21 are in the range of 60 to 85°, preferably in the range of 65 to 75°. In a preferred variant of embodiment, the inclination angles $\alpha_{20}$ and $\alpha_{21}$ of all the truncated pyramids 20, 21 constituting the base body 2 are identical. At least one of the truncated pyramids 20, 21 constituting the base body 2 may be arranged along its height by two or more consecutive partial pyramids with different inclination angles $\alpha_{20}$ or $\alpha_{200}$—see, e.g., FIG. 7, which illustrates a variant in which the lower truncated pyramid 20 is composed of two consecutive partial pyramids 20a and 20b, the inclination angle $\alpha_{200}$ of the upper one being smaller than the inclination angle $\alpha_{20}$ of the lower one.

The bases 200, 201, 210, 211 of the truncated pyramids 20, 21 constituting the base body 2 may generally have the shape of an n-sided polygon, including a star polygon, preferably regular, wherein n is equal to 3 to infinity, more preferably 3, 4, 6, 8, 12, 16, most preferably 4. If n is equal to infinity, the base 200, 201, 210, 211 of the given part of the base body 2 is formed by a circle, an oval, a conic section or another continuous shape and the given part of the base body 2 is thus formed by a truncated cone. In a preferred variant of embodiment, both bases 200, 201, 210, 211 of all truncated pyramids/cones 20, 21 constituting the base body 2 have the same shape.

Figure 3:
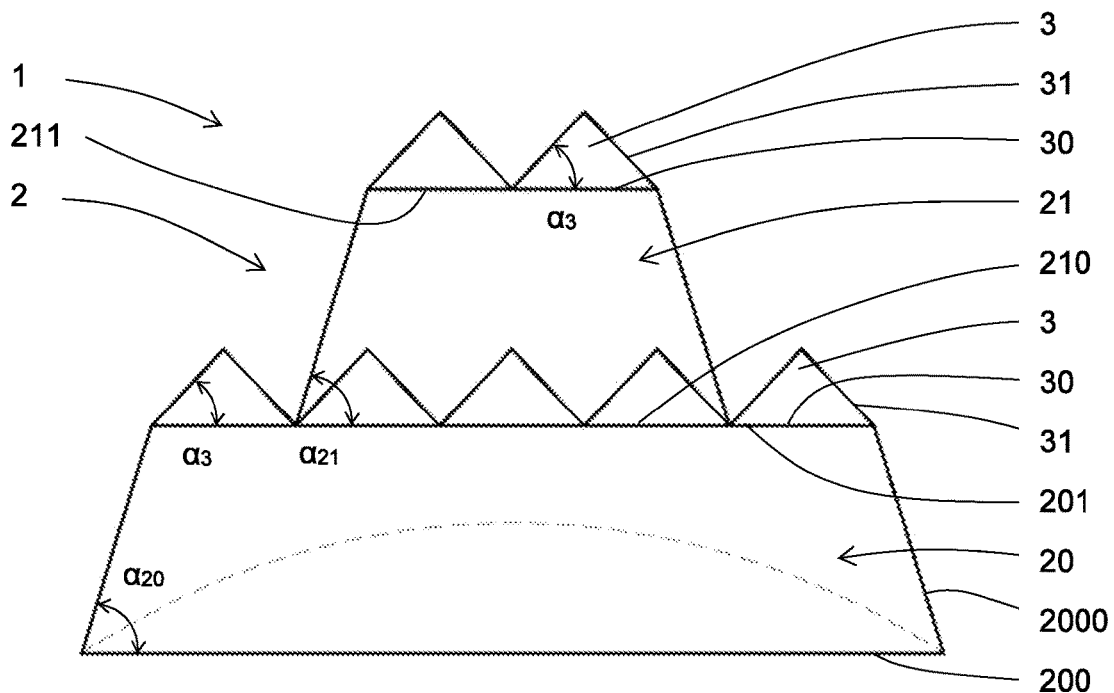
FIG. 3 shows a second exemplary embodiment of the structure of a photovoltaic module or a concentrator of solar radiation according to the invention.
Figure 29:
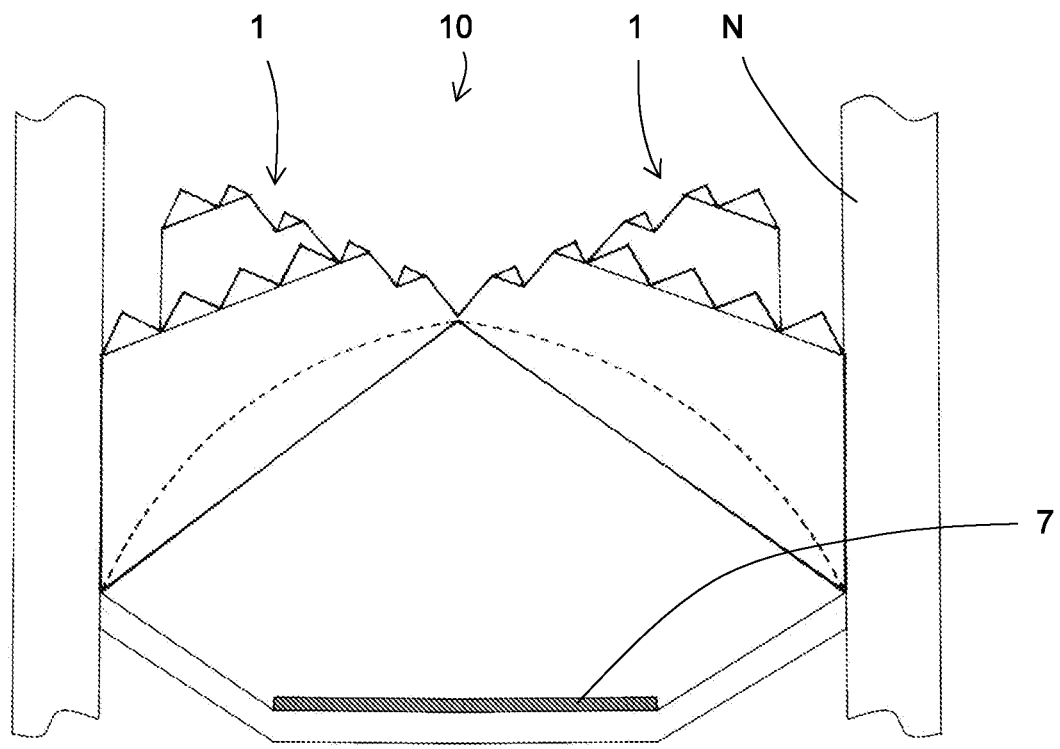
FIG. 29 shows an embodiment of a spatial combination of the structures of a photovoltaic module or a concentrator of solar radiation in the variant of FIG. 28.

According to the requirements and intended application, the bottom base 200 of the lower truncated pyramid/cone 20 is planar or is spatially shaped in at least a part of its surface—preferably continuously, e.g., as a convex or concave surface. A preferred variant with the bottom base 200 of the lower truncated pyramid 20 being concave in its entire area is shown in FIG. 3 and FIG. 29. This shaping of the bottom base 200 helps the concentrator of solar radiation to direct the solar radiation even more optimally towards the unillustrated photovoltaic cell or module located below the bottom base 200 of the base body 2. Analogous concave shape of the bottom base 200 of the lower truncated pyramid/cone 20 may be formed in any of the described variants of the spatial structure 1 of a photovoltaic module or a concentrator of solar radiation according to the invention. The radius of this concave curve (which is preferably greater than the diameter of the bottom base 200 of the lower truncated pyramid/cone 20) and location of this curve are determined by the specific dimensions of the spatial structure 1 and conditions in the specific location. The inclination angle $\alpha_{20}$ of the lower truncated pyramid/cone 20 is measured in this variant, as well as in variants having a different shaping of the bottom base 200 of the lower truncated pyramid/cone from a plane intersected by all points on the circumference of the bottom base 200 of the lower truncated pyramid/cone 20. In an unillustrated variant of embodiment, at least one of the truncated pyramids/cones 20, 21 is formed by a truncated cone, i.e., both of its bases 200, 201, 210, 211 are formed by an n-sided polygon, where n equals to infinity. However, the principle of the invention will be further explained on an embodiment with truncated pyramids 20, 21 with square bases 200, 201, 210, 211; for other shapes of the bases 200, 201, 210, 211 all the information below applies analogously.

In another unillustrated variant, the individual truncated cones 20, 21 constituting the base body 2 may differ in their height and/or inclination angle $\alpha_{20}$, $\alpha_{21}$.

On the top base 201 of the lower truncated pyramid 20, upwardly oriented concentration projections 3 in the shape of a pyramid or cone are evenly arranged around the circumference of the bottom base 210 of the upper truncated pyramid 21. The height of these concentration projections 3 is in this case equal to or smaller than the height of the upper truncated pyramid 21 of the base body 2. In a preferred variant of embodiment, shown in FIG. 2, 16 identical concentration projections 3 are evenly arranged around the circumference of the bottom base 210 of the upper truncated pyramid/cone 21.

Preferably, at least one concentration projection 3 is arranged on the top base 211 of the upper truncated pyramid 21. In the embodiments shown in FIGS. 2, 3, 10, 11, 12, 13, 14, 20, 22 and 23, on the top base 211 of the upper truncated pyramid 21, four mutually identical upwardly oriented concentration projections 3 in the shape of a pyramid or cone are arranged next to each other in a 2×2 matrix. The bases 31 of these concentration projections 3 preferably cover the entire area of the top base 211 of the upper truncated pyramid 21.

The inclination angle $\alpha_3$ of the concentration projections 3, i.e., the angle between the base 30 of these projections and their side walls 31 is in the range of to 55°, preferably 23 to 48°. The base 30 of these concentration projections 3 may generally have the shape of an n-sided polygon, including a star polygon, preferably regular, wherein n is equal to 3 to infinity, more preferably 3, 4, 6, 8, 12, 16, most preferably 4, or infinity. If n is equal to infinity, the base 30 of the given concentration projection 3 is formed by a circle, an oval, a conic section or another continuous shape and the given part of the concentration projection 3 is thus formed by a cone or a truncated cone. In a preferred variant of embodiment, the concentration projections 3 have a base 30 of the same shape as the lower truncated pyramid/cone 2 and/or the upper truncated pyramid/cone 21 of the base body 2.

Any of the concentration projections 3 of the structure can be terminated in a sharp point or rounding.

In the most preferred embodiment variant, all the concentration projections 3 of the structure 1 are identical to each other, but this is not a necessary condition.

In unillustrated variants of embodiment, at least one of the concentration projections 3 can be formed along its height by two or more consecutive sections with a different inclination angle $\alpha_3$, or $\alpha_{31}$.

For the correct function of the spatial structure 1 of a photovoltaic module or a concentrator of solar radiation according to the invention, it is sufficient if at least one concentration projection 3 is arranged on at least one base of at least one part of the base body 1; however, with the number of concentration projections 3, the achieved power increases.

Figure 4:
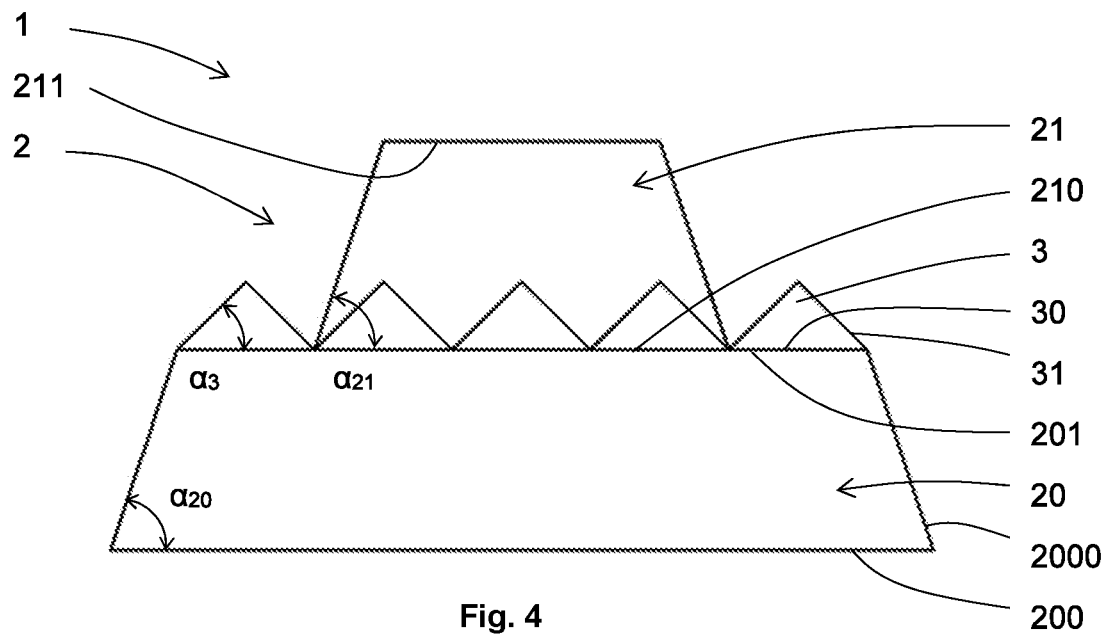
FIG. 4 shows a third exemplary embodiment of the structure of a photovoltaic module or a concentrator of solar radiation according to the invention.
Figure 5:
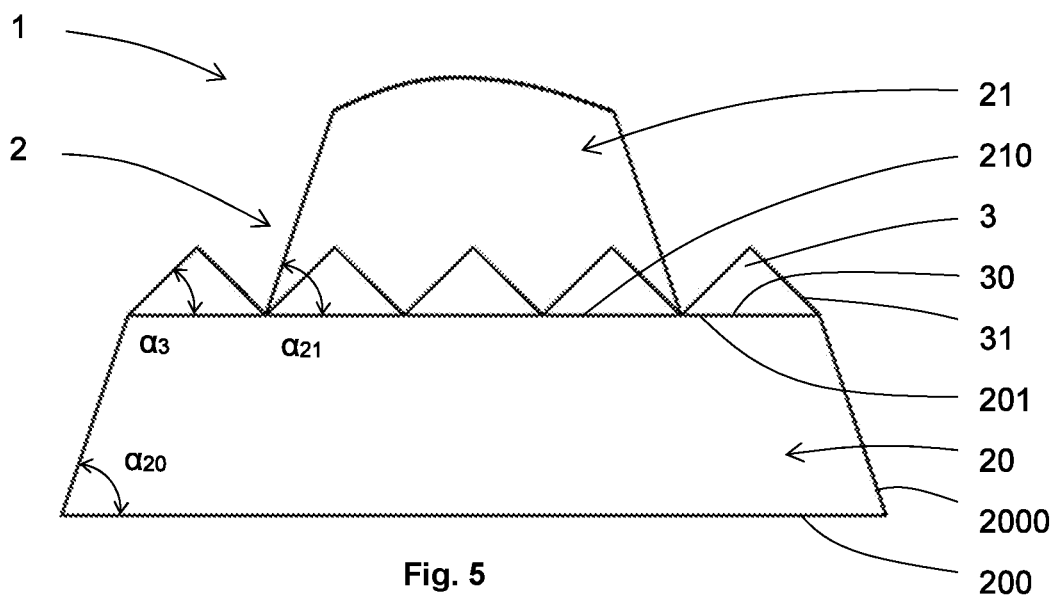
FIG. 5 shows a fourth exemplary embodiment of a combination of two structures of a photovoltaic module or a concentrator of solar radiation according to the invention.
Figure 6:
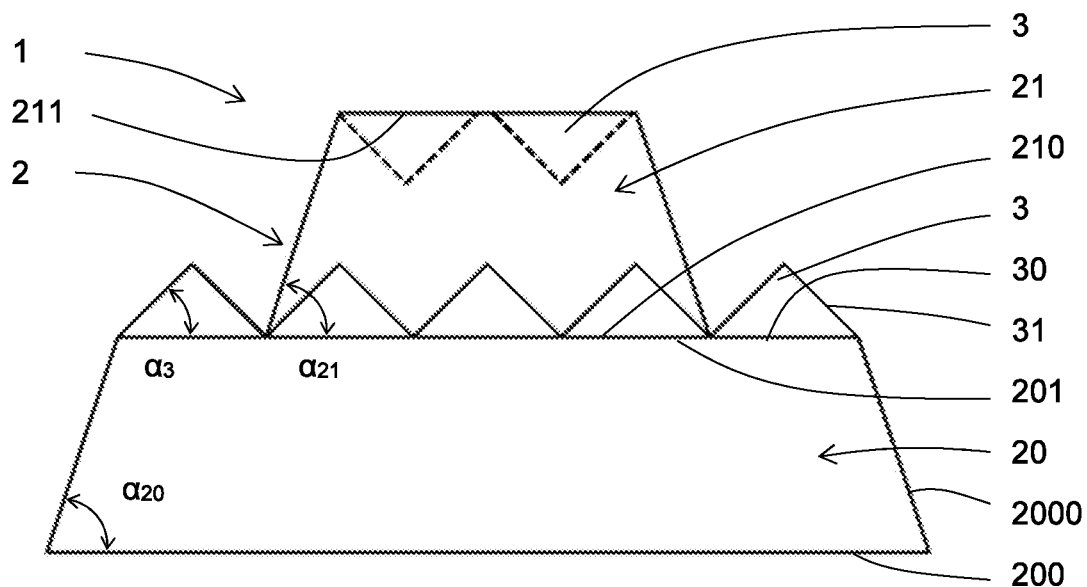
FIG. 6 shows a fifth exemplary variant of the structure of a photovoltaic module or a concentrator of solar radiation according to the invention.
Figure 7:
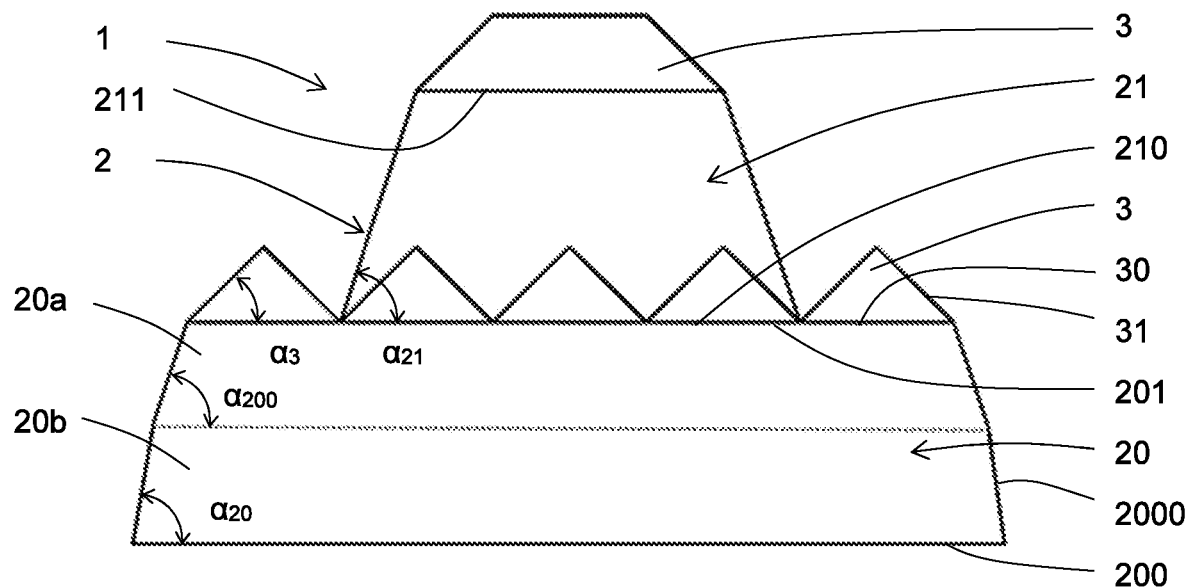
FIG. 7 shows a sixth exemplary variant of the structure of a photovoltaic module or a concentrator of solar radiation according to the invention.

In some variants of embodiment, the top base 211 of the upper truncated pyramid/cone 21 of the base body 2 may be without concentration projections 3, wherein it may be straight—see, e.g., FIG. 4, or inclined, curved (convex or concave) at least on part of its surface—see e.g. FIG. 5, broken or folded, or at least one recess 4 or at least one row of adjacent recesses 4 may be formed in it, whereby the shape of the recess/recesses, corresponds, for example, to the shape of an inverted concentration projection 3 in any of the variants described above—see, e.g., FIG. 6, or on at least part of the area of the top base 211 of the upper truncated pyramid 21 is arranged at least one concentration projection 3, preferably, e.g., a concentration projection 3 in the shape of a pyramid or a truncated pyramid with a rectangular base, or in the shape of a triangular prism (preferably with inclined faces) whose apex is formed by an edge—see, e.g., FIG. 7, etc.

In another unillustrated variant of embodiment, the top base 201 of the lower truncated pyramid/cone 20 has no concentration projections 3 and the concentration projection/projections 3 is/are arranged on the top base 211 of the upper truncated pyramid/cone 21.

Figure 8:
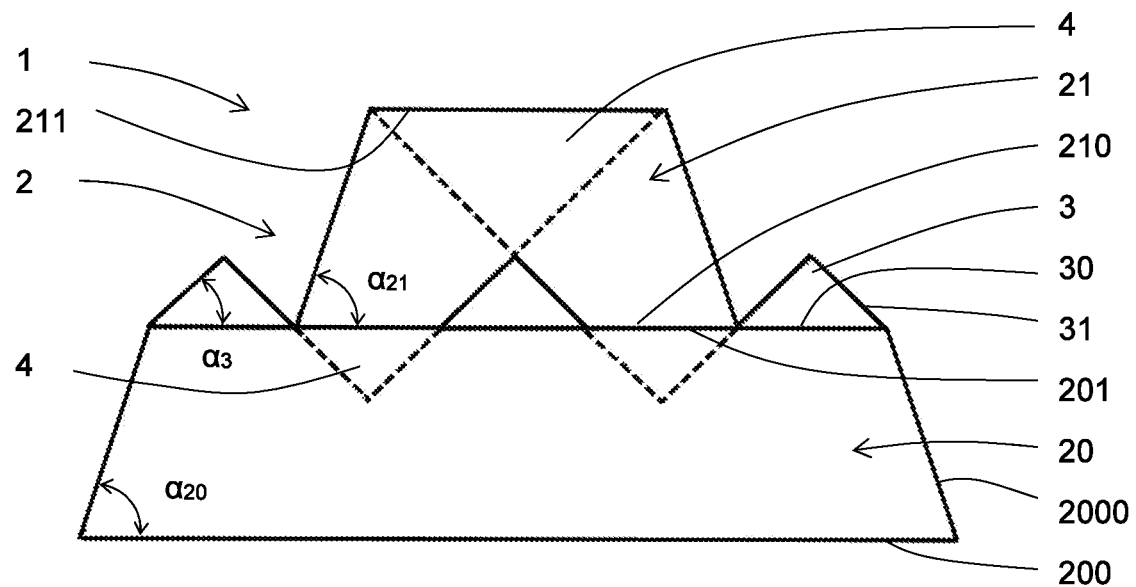
FIG. 8 shows a seventh exemplary variant of the structure of a photovoltaic module or a concentrator of solar radiation according to the invention.

FIG. 8 shows a variant of the structure 1 according to the invention, in which a recess 4 in the shape of an inverted concentration projection 3 in any of the variants of embodiment described above is formed in the top base 211 of the upper truncated pyramid/cone 21. On the top base 201 of the lower truncated pyramid/cone 20 concentration projections 3 and recesses 4 in the shape of inverted concentration projections 3 are alternately arranged around the circumference of the bottom base 210 of the upper truncated pyramid/cone 21. Preferably, the concentration projections 3 and recesses 4 smoothly merge into each other. In the illustrated variant of embodiment, the recess 4 in the top base 211 of the upper truncated pyramid/cone 21 has at least one dimension greater than the recesses 4 in the top base 201 of the lower truncated pyramid/cone 2; in an unillustrated variant, it may be identical to them, or it may have at least one smaller dimension. The dimensions of the recesses 4 in the top base 201 of the lower truncated pyramid/cone 20 correspond to the dimensions of the concentration projections 3 on the top base 201 of the lower truncated pyramid/cone 20. In unillustrated variants of embodiment, all the recesses 4 may be identical. Within one structure 1, more types of concentration projections 3 and/or recesses 4 can be combined.

Figure 9:
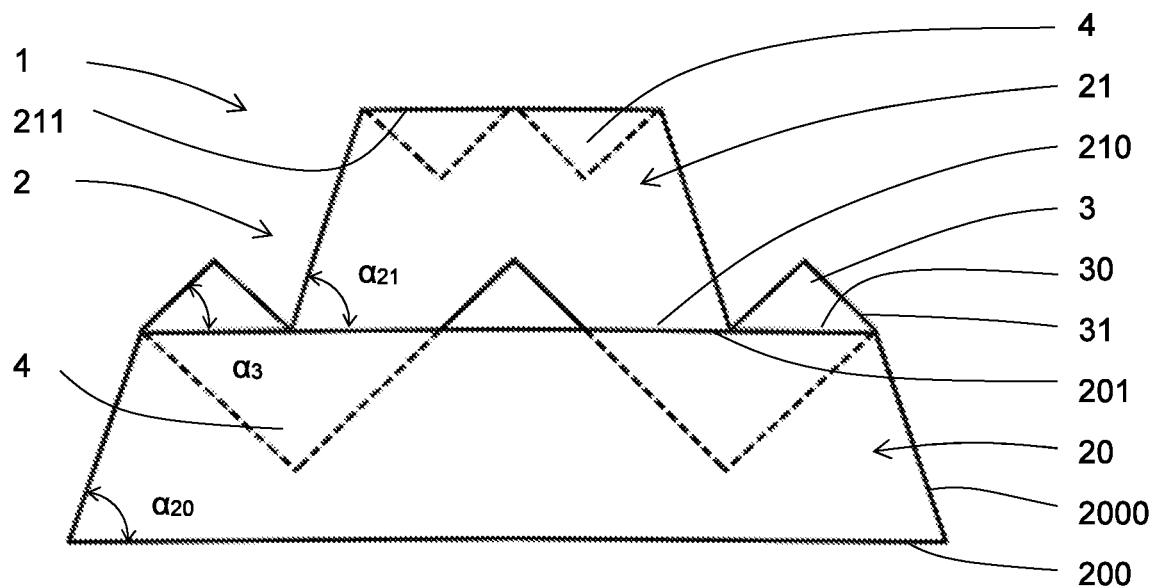
FIG. 9 shows an eighth exemplary variant of the structure of a photovoltaic module or a concentrator of solar radiation according to the invention.

A similar variant of the structure 1 according to the invention is shown also in FIG. 9 with the difference that in this case recesses 4 (in a 2×2 matrix) in the shape of an inverted concentration projection 3 in any above-described variant of embodiment 1 are formed in the top base 21 of the upper truncated pyramid 21. On the top base 201 of the lower truncated pyramid/cone 20 around the circumference of the bottom base 210 of the upper truncated pyramid/cone 21 are alternately arranged concentration projections 3 a recesses 4 in the shape of inverted concentration projections 3, wherein the recesses 4 in the top base 211 of the upper truncated pyramid/cone 21 have the same dimensions as the concentration projections 3 on the top base 201 of the lower truncated pyramid/cone 20, and recesses 4 in the top base 201 of the lower truncated pyramid/cone 20 have at least one dimension greater. In unillustrated variants of embodiment, the recesses 4 in the top base 211 of the upper truncated pyramid/cone 21 and the recesses 4 in the top base 201 of the lower truncated pyramid/cone 20 may be identical, or, when appropriate, the recesses 4 in the top base 211 of the upper truncated pyramid/cone 21 may have at least one dimension greater than the recesses 4 in the top base 211 of the upper truncated pyramid/cone 21. Several types of concentration projections 3 and/or recesses 4 can be combined within one structure 1.

Figure 2:
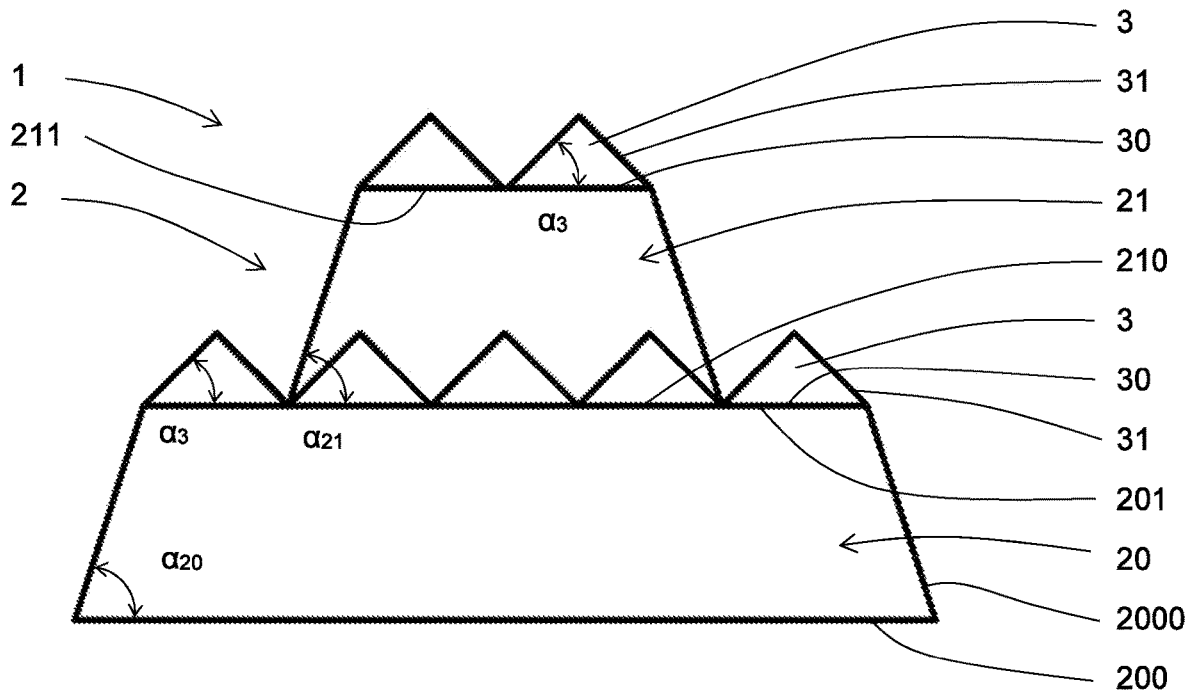
Figure 10:
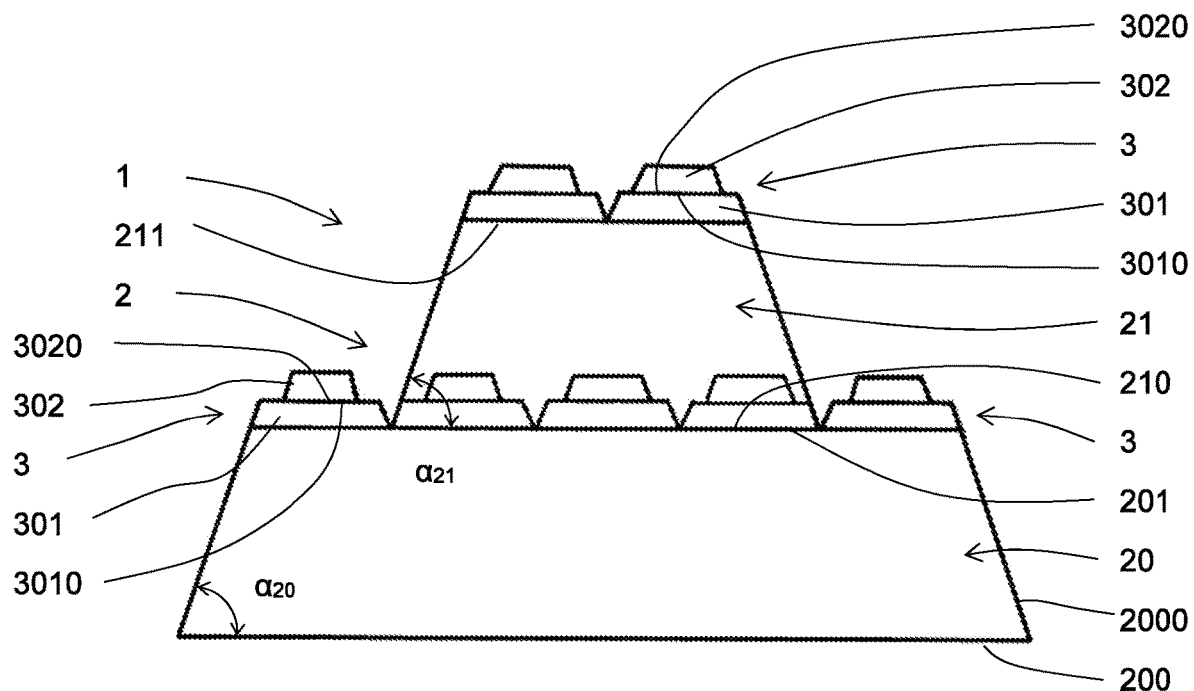
FIG. 10 shows a ninth exemplary variant of the structure of a photovoltaic module or a concentrator of solar radiation according to the invention.

FIG. 10 shows a variant of the special structure 1 of a photovoltaic cell or a concentrator of solar radiation according to the invention, which corresponds to the variant shown in FIG. 2, with the difference that the concentration projections 3 are formed by two truncated pyramids/cones 301, 302 arranged on each other, wherein the upper truncated pyramid/cone 302 constituting the concentration projection 3 is arranged with its bottom base 3020 preferably in the centre, on the top base 30101 of the lower truncated pyramid/cone 301 constituting the concentration projection 3, wherein the area of the bottom base 3020 of the upper truncated pyramid/cone 302 is smaller than the area of the top base 3010 of the lower truncated pyramid/cone 301. The concentration projections 3 of this type may be within one spatial structure 1 of a photovoltaic module or a concentrator of solar radiation arbitrarily combined with concentration projections 3 of any of the above types, or, when appropriate, with the recesses 4.

Figure 11:
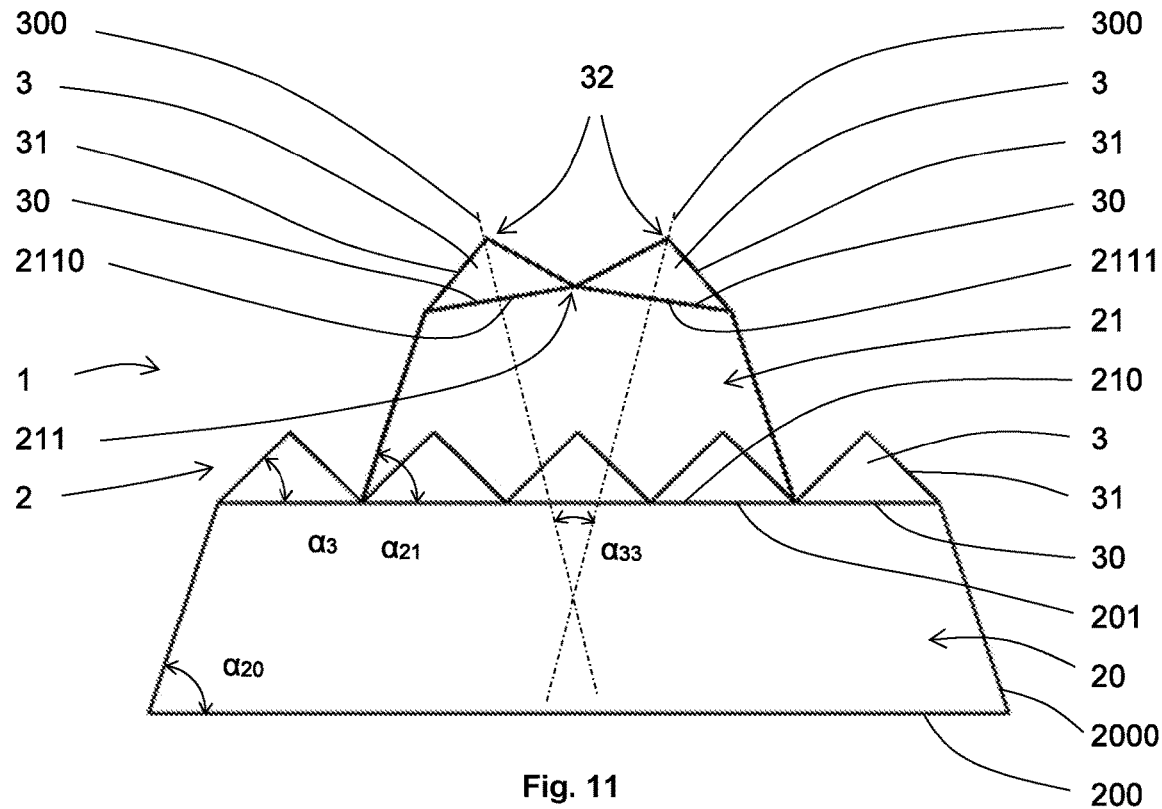
FIG. 11 shows a tenth exemplary variant of the structure of a photovoltaic module or a concentrator of solar radiation according to the invention.

In a specific variant 1 of a photovoltaic cell or a concentrator of solar radiation according to the invention shown in FIG. 11, two inclined surfaces 2110 are formed on the top base 211 of the upper truncated pyramid/cone 21, 2111, wherein at least one concentration projection 3 is arranged on each of them, wherein these concentration projections 3 are mutually arranged so that their axes 300, which pass through their apexes 32 and the centres of their bases 30, form an angle $\alpha_{33}$ of 40 to 90°, preferably 45 to 65°. More such pairs of concentration projections 3 can be arranged on the top base 211 of the upper truncated pyramid 21—e.g., they can be arranged in at least two parallel rows, or in two or more pairs arranged around the circumference of the top base 211. Analogously, it is possible to form at least one recess 4 in at least one inclined surface 2110, 2111.

The concentration projections 3 arranged on the inclined surfaces 2110, 2111 on the top base 211 of the upper truncated pyramid/cone 21 have one of the above-described shapes of concentration projections 3, wherein in some parameters they may differ from the concentration projections 3 arranged on the top base 201 of the lower truncated pyramid/cone 20 or may be identical to them. The concentration projections 3 on the inclined surfaces 2110, 2111 on the top base 211 of the upper truncated pyramid/cone 21 are in the illustrated variant of embodiment identical, nevertheless, in other variants they may differ from each other by its shape and/or by at least one dimension.

The inclined surfaces 2110, 2111 on the top base 211 of the upper truncated pyramid/cone 21 are directly connected to each other in the illustrated variant of embodiment. However, in an unillustrated variant, a substantially arbitrarily shaped transition surface can be formed between them. Optionally, at least one further concentration projection 3 of any of the constructions described above can be arranged on the transition surface.

Figure 12:
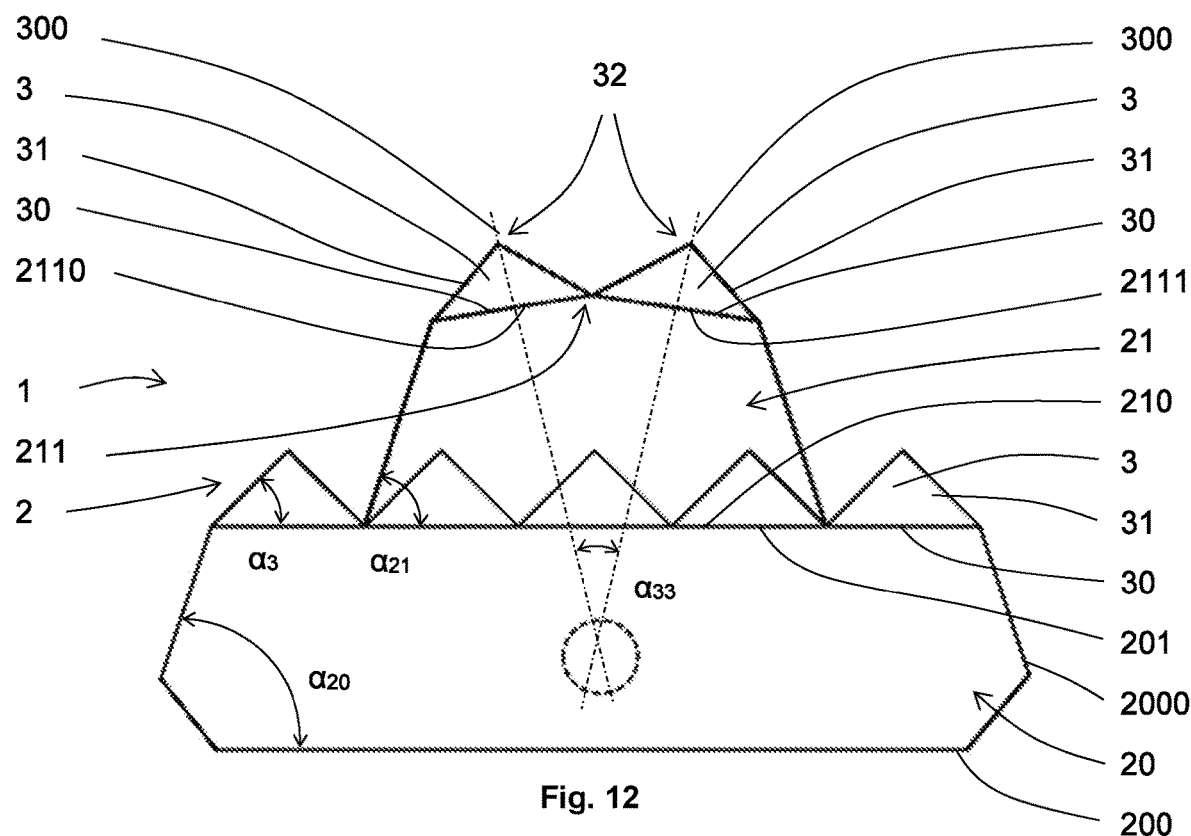
FIG. 12 shows an eleventh exemplary variant of the structure of a photovoltaic module or a concentrator of solar radiation according to the invention.

FIG. 12 shows a modified variant of the spatial structure 1 of a photovoltaic cell or a concentrator of solar radiation according to the invention shown in FIG. 11. In this variant, at least two opposite edges of the bottom base of the base body 2 are chamfered, which, in cases where the spatial structure 1 serves as a concentrator of solar radiation, facilitates the concentration of solar radiation onto an unillustrated photovoltaic cell or module arranged underneath, the area of which is smaller than the area of the bottom base 20 of the base body 2 of the concentrator 1. At the same time, a possible coolant duct for cooling the structure 1 is indicated in dashed lines in the base body 2.

Figure 13:
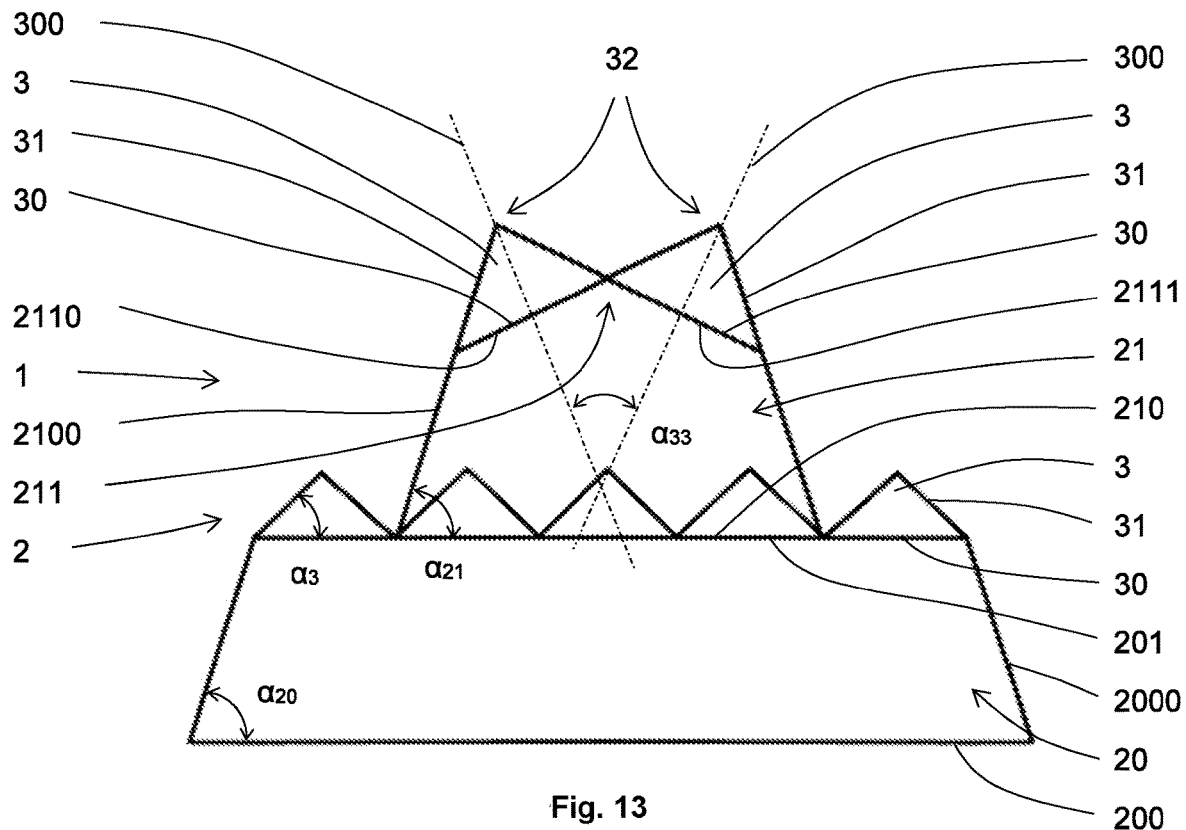
FIG. 13 shows a twelfth exemplary variant of the structure of a photovoltaic module or a concentrator of solar radiation according to the invention.

FIG. 13 shows another modified variant of the spatial structure 1 of a photovoltaic cell or a concentrator of solar radiation according to the invention shown in FIG. 11. In this variant, the inclined surfaces 2110, 2111 on the top base 211 of the upper truncated pyramid 21 and the concentration projections 3 are arranged on them so that the side walls 31 of these concentration projections 3 lie in a common plane with the side walls 2100 of the upper truncated pyramid 21 of the base body 2.

In an unillustrated variant of embodiment, the inclined surfaces 2110, 2111 on the top base 211 of the upper truncated pyramid 21 and the concentration projections 3 thereon are arranged in such a way that the adjacent side walls 31 of the adjacent concentration projections 3 lie in a common plane. That makes it possible, for example, to cover them by a suitable planar material for their mechanical protection.

Figure 14:
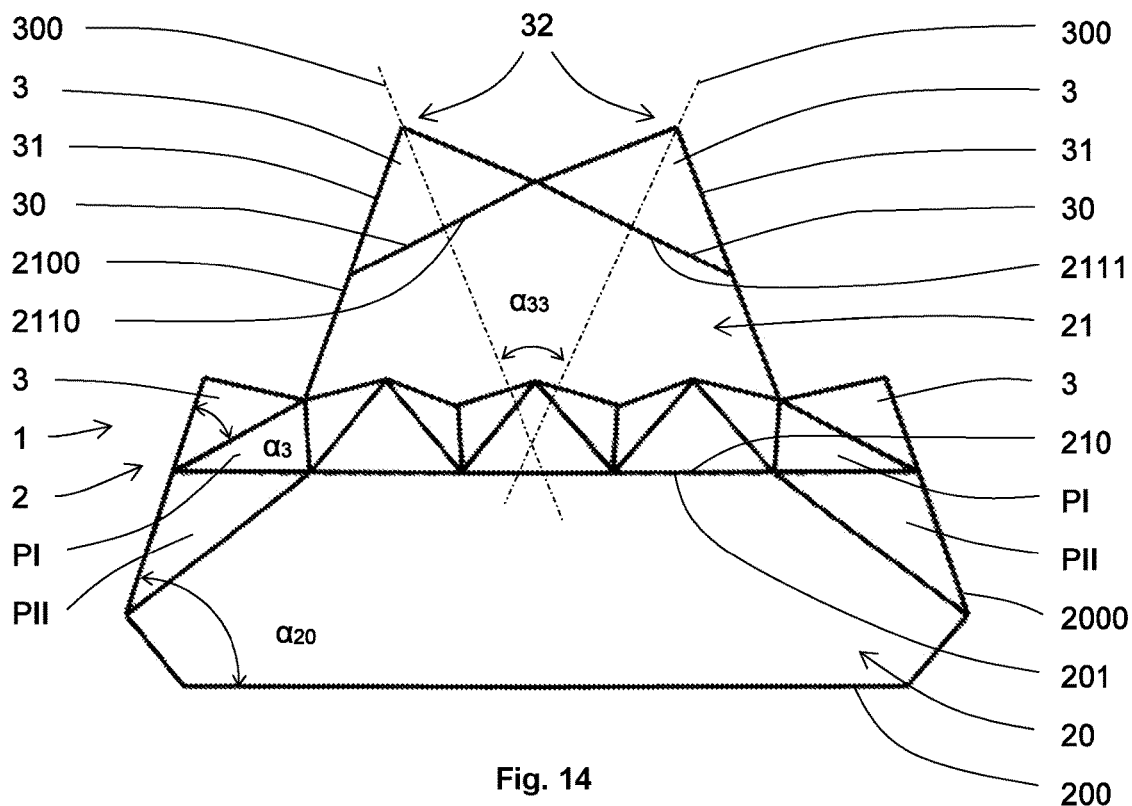
FIG. 14 shows a thirteenth exemplary variant of the structure of a photovoltaic module or a concentrator of solar radiation according to the invention.

A similar variant of the structure 1 as in FIG. 13 is shown also in FIG. 14. In this variant, parts of the top base 201 of the lower truncated pyramid/cone 20 around the circumference of the bottom base 210 of the upper pyramid/cone 21 are formed as inclined surfaces, the concentration projections 3 arranged thereon being oriented obliquely away from the upper truncated pyramid/cone 21. In the case where the lower part of the base body 2 is formed by a truncated pyramid, pairs of interconnected triangular transition surfaces PI and PII are formed at their corners. These transition surfaces PI and PII appropriately increase the area of the spatial structure 1 of a photovoltaic cell or a concentrator of solar radiation.

Figure 15:
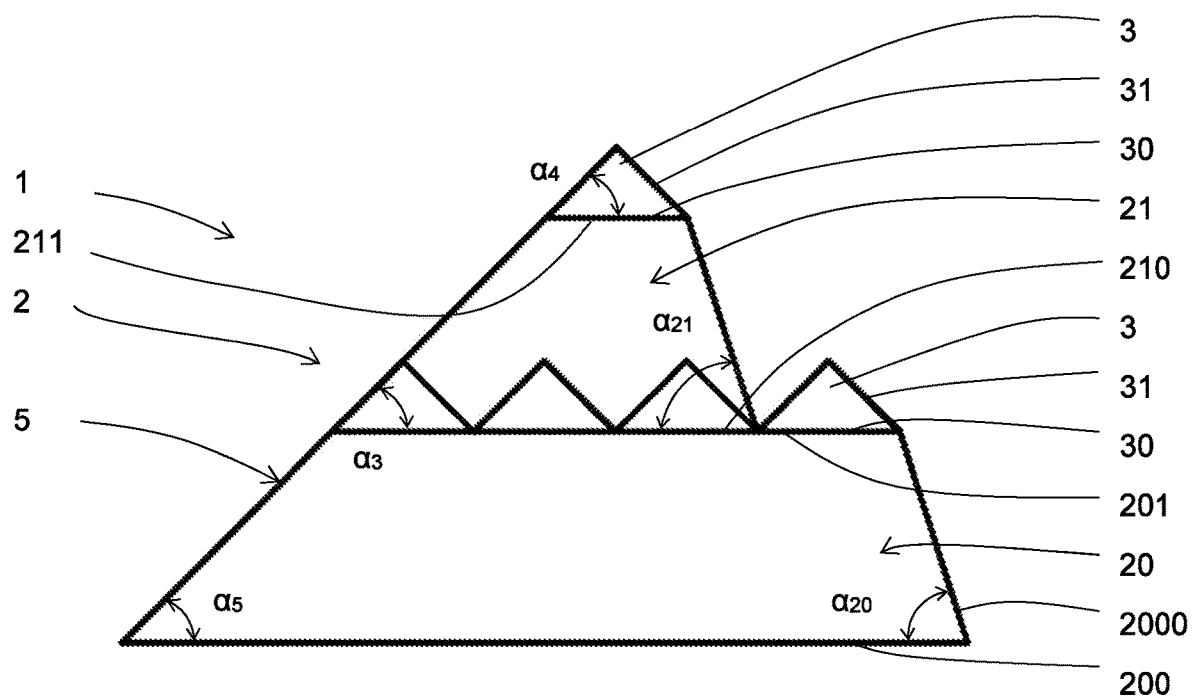
FIG. 15 shows a fourteenth exemplary variant of the structure of a photovoltaic module or a concentrator of solar radiation according to the invention.
Figure 16:
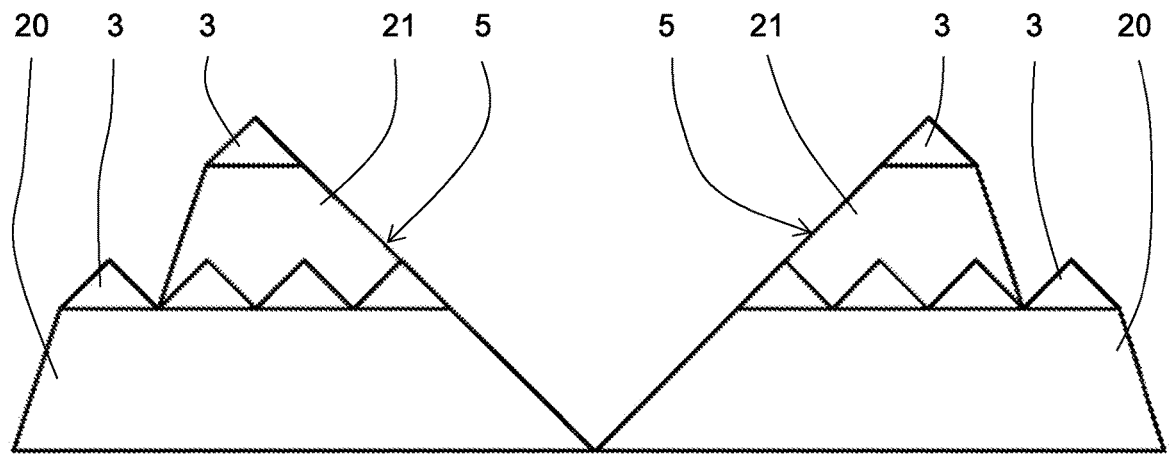
FIG. 16 shows an advantageous combination of two structures of a photovoltaic module or solar concentrator according to the invention in the variant of FIG. 15.

In the variant of embodiment shown in FIG. 15, which, on the basis of the experiments performed, appears to be more advantageous for practical use, the base body 2 of the structure 1 according to FIG. 2 is provided with a chamfer 5 guided at an angle as in the range of 20 to 85° along the entire height of the base body 2—from the bottom base 200 of the lower truncated pyramid/cone 2 to the centre of the top base 211 of the upper truncated pyramid/cone 21, along at least a part of the length, preferably along the entire length of one edge of the bottom base 200 of the lower truncated pyramid/cone 20. Especially if the bottom base 200 of the lower pyramid/cone 20 has more than 4 edges, the base body 2 of the structure 1 of a photovoltaic cell or a concentrator of solar radiation may be provided with more partial chamfers 5, each of them being guided along at least a part of the length of one edge of the bottom base 200 of the lower truncated pyramid 20. In a preferred variant of embodiment, these chamfers 5 are immediately adjacent to each other. In another variant of embodiment, the chamfer 5, or at least one of the chamfers 5, is guided along at least part of the length of the connecting line of two non-adjacent apexes of the bottom base 200 of the lower pyramid 20. Due to this chamfer/these chamfers 5, a smaller number of concentration projections 3 are arranged on the top base 211 of the upper truncated pyramid/cone 21 and on the top base 201 of the lower truncated pyramid/cone 20—in the variant shown in FIG. 15 there are 2 concentration projections 3 (in a view of FIG. 15 arranged one behind the other) on the top base 211 of the upper truncated pyramid 21 and 11 concentration projections 3 on the top base 201 of the lower truncated cone 20. Also in this variant, the top base 211 of the upper truncated pyramid/cone 21 can be formed in one of the variants described above—e.g., without concentration projections 3, e.g., straight, inclined, rounded (convex or concave) on at least part of its surface. Alternatively, there may be formed therein at least one recess 4 or at least one row of recesses 4 arranged side by side, whose shape, e.g., corresponds to the inverse shape of one of the above described types of concentration projection 3, or, where appropriate, on at least part of the area of the top base 211 of the upper truncated pyramid 21 may be arranged at least one concentration projection 3, e.g., in the shape of a pyramid or a truncated pyramid with a rectangular base, or in the shape of a triangular prism (preferably with inclined faces) whose apex is formed by an abscissa.

Figure 17:
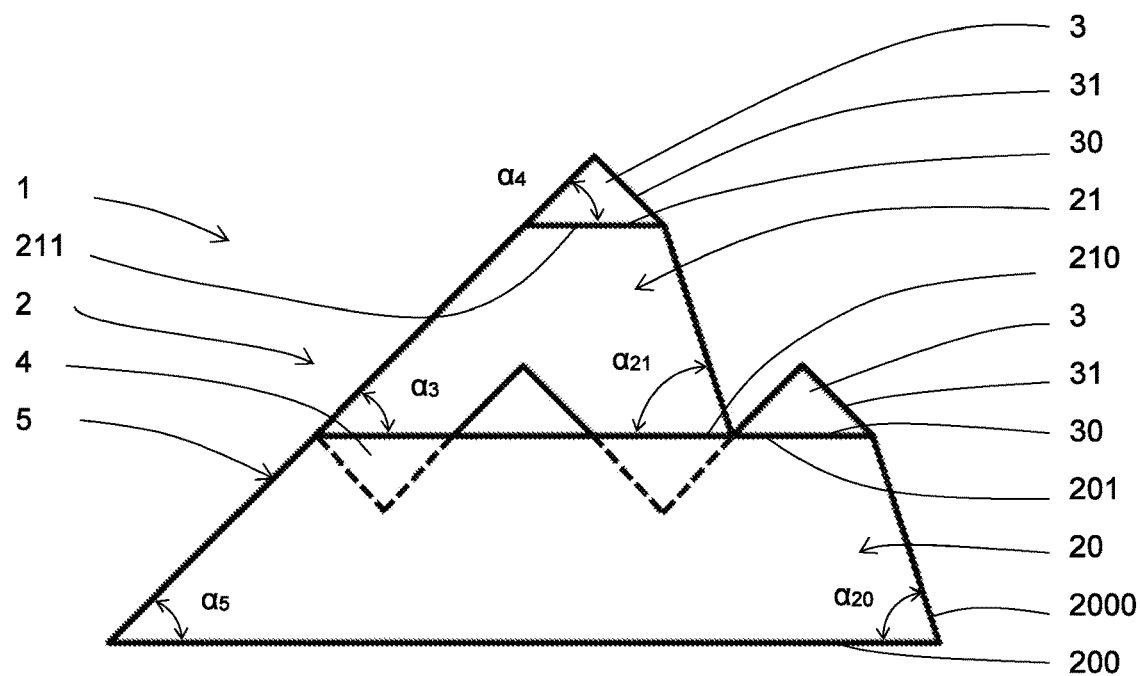
FIG. 17 shows another exemplary variant of the structure of a photovoltaic module or a concentrator of solar radiation according to the invention.

For clarity, FIG. 17 shows a modified variant of the spatial structure of a photovoltaic cell or a concentrator of solar radiation according to FIG. 15. On the top base 201 of the lower truncated pyramid/cone 20, the concentration projections 3 and recesses 4 in the shape of inverted concentration projections 3 are alternately arranged around the circumference of the bottom base 210 of the upper truncated pyramid/cone 21. Preferably, the concentration projections 3 and recesses 4 smoothly merge into each other. The dimensions of the recesses 4 in the variant shown correspond to the dimensions of the concentration projections 3 on the top base 201 of the lower truncated pyramid/cone 20. Several types of concentration projections 3 and/or recesses 4 can be combined within one structure 1.

Analogously, in the embodiments shown in FIGS. 8 and 9, at least one recess 4 can be formed in the top base 211 of the upper truncated pyramid/cone 21.

Figure 18:
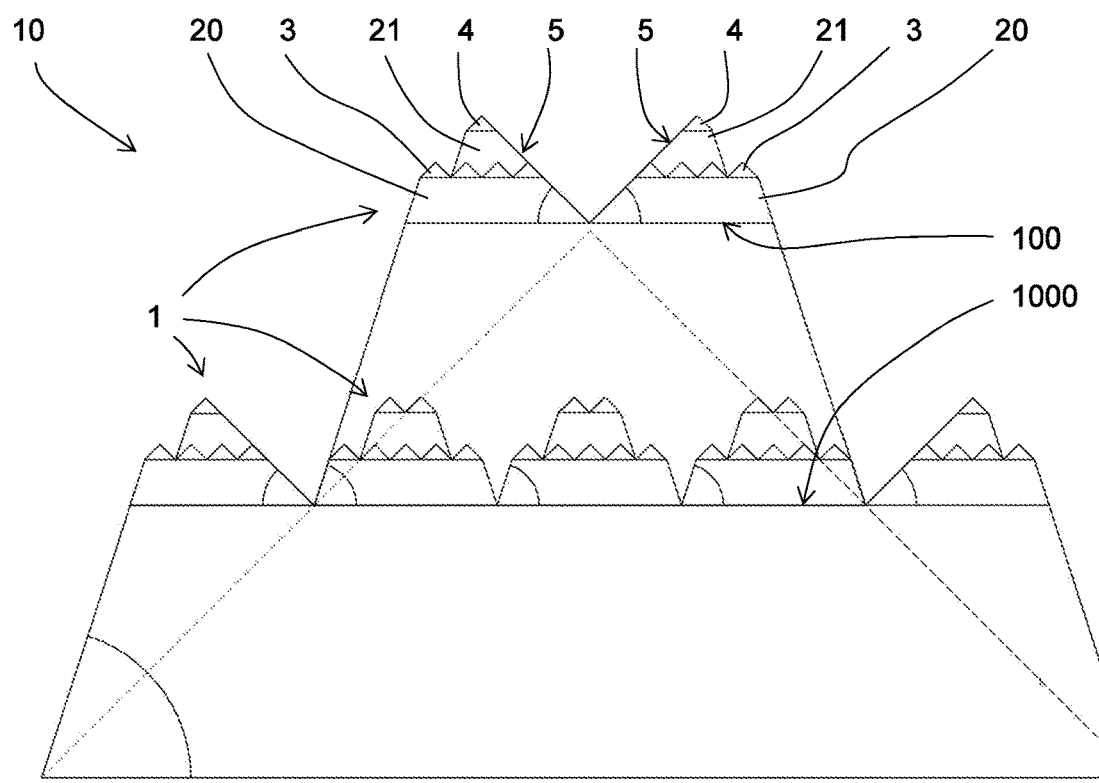
FIG. 18 shows a spatial combination of structures of a photovoltaic module or a concentrator of solar radiation in the variant of FIG. 2 and FIG. 15.

In the case of a combination of several spatial structures 1 according to the invention in the variant shown in FIG. 15 or 17, these structures 1 are preferably facing each other with their chamfers 5, which prevents them from shielding each other—see FIGS. 16, 18, 19 and 19a. FIG. 18 shows a more complex spatial construction 10, which combines the structures 1 of a photovoltaic cell or a concentrator of solar radiation according to the invention in the variant of FIG. 15 and which itself corresponds by its shape to the structure 1 of a photovoltaic cell or a concentrator of solar radiation of FIG. 2. The structures 1 are provided with a chamfer 5 oriented towards the opposite structure 1, the corner structures 1 being provided with two chamfers 5—each oriented towards one of the adjacent structures 1. In an unillustrated variant of embodiment, also this spatial construction 10 as a whole may be provided with a chamfer which corresponds to the chamfer 5 of the structure 1 of FIG. 15—see the indication by the dashed lines. In addition, these constructions 10 are in an analogous manner further combined into other more complex spatial structures.

Figure 19:
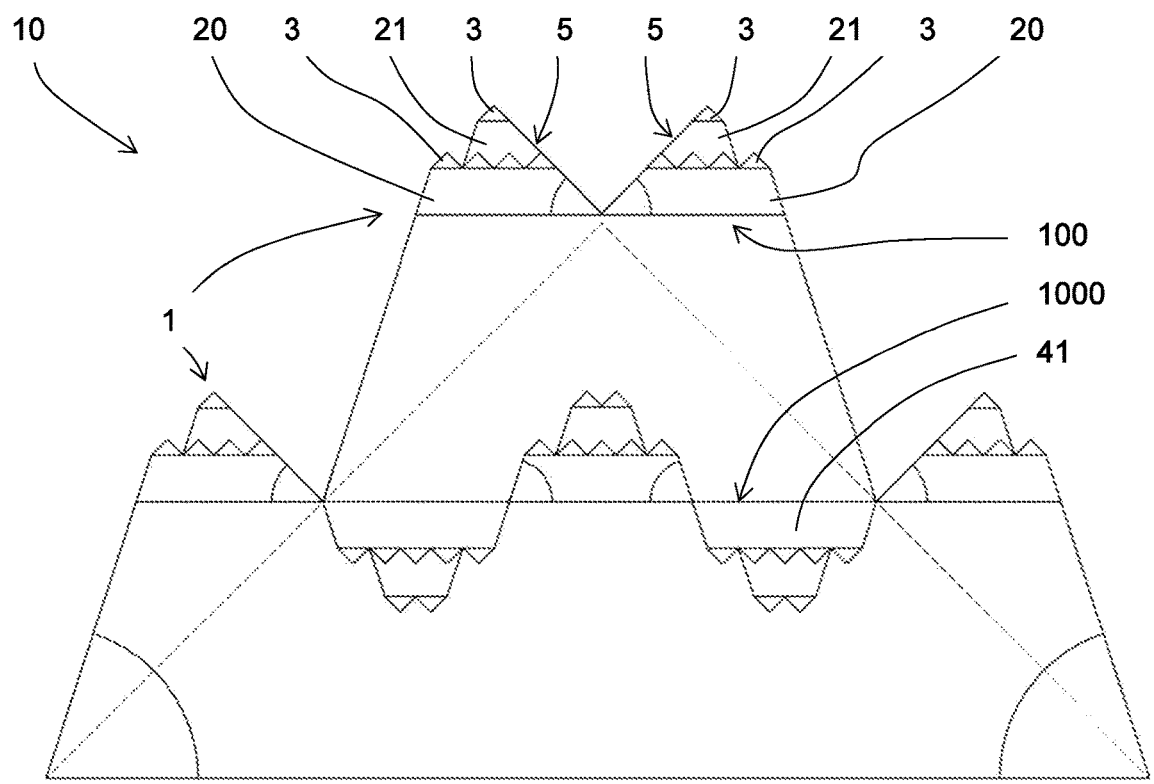
FIG. 19 shows another exemplary variant of a spatial combination of the structures of a photovoltaic module or a concentrator of solar radiation in the variant of FIG. 2a FIG. 15.
Figure 19A:
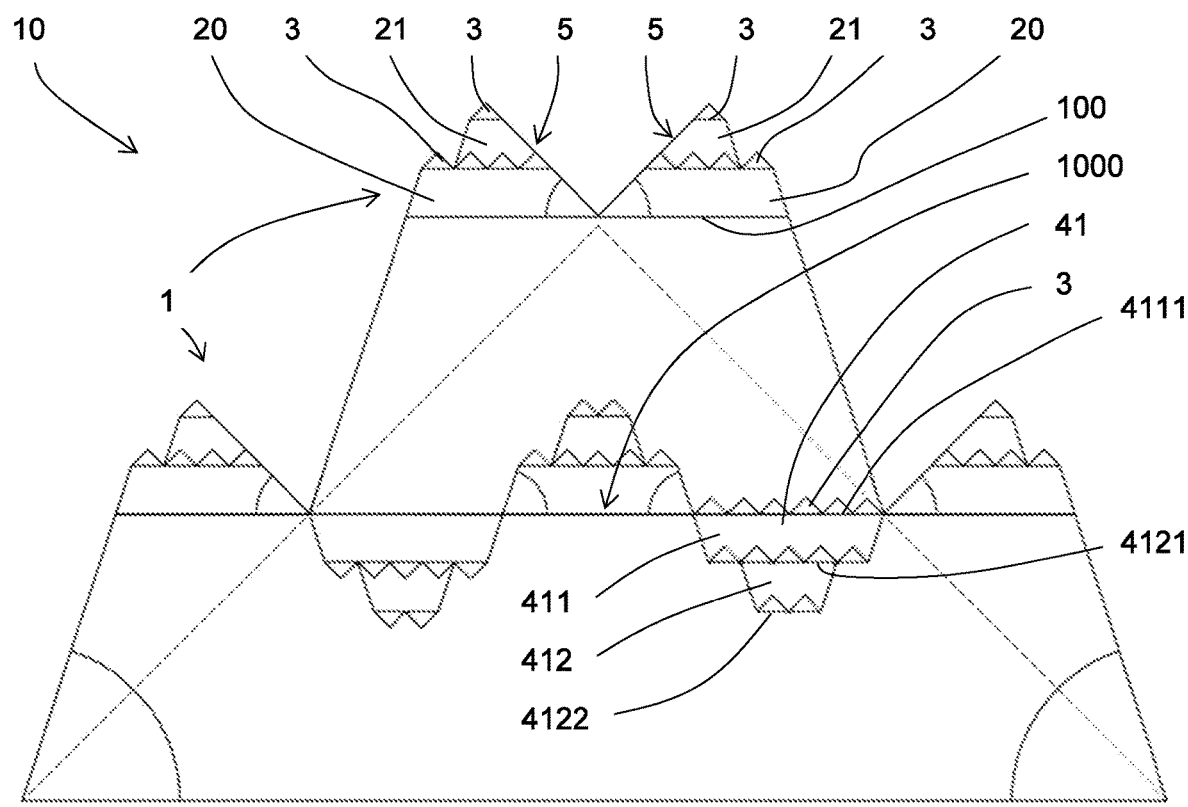
FIG. 19a shows another variant of a spatial combination of the structures of a photovoltaic module or a concentrator of solar radiation according to FIG. 19.

FIG. 19 shows another variant of the spatial construction 10 according to FIG. 18, with the difference that in this variant, some spatial structures 1 according to the invention are replaced with analogous inverted recesses 41. FIG. 19a shows a similar variant of the spatial construction 10 as in FIG. 19, with the difference that one of the recesses 41 has a different construction—it is formed by two (or more) interconnecting sub-recesses 411 and 412 in the shape of a truncated cone or pyramid, wherein the concentration projections 3 of any construction described above are arranged around the circumference of the top base 4111 of the upper sub-recess 411, around the circumference of the top base 4121 of the lower sub-recess 412 and on the bottom base 4122 of the lower sub-recess 412. This structure 1 is also shown in more detail in FIG. 24a. In unillustrated variants of embodiment, the concentration projections 3 need not be arranged evenly around the circumference of the bases 4111, 4121, 4122 of the sub-recesses 411, 412. Similarly, a recess 41 can be formed by several sub-recesses 411, 412. Within a single recess 41, it is possible to combine concentration projections of any construction described above and sub-recesses 4 of any construction described above.

The structure 1 of a photovoltaic cell or a concentrator of solar radiation according to the invention is preferably monolithic.

Figure 20:
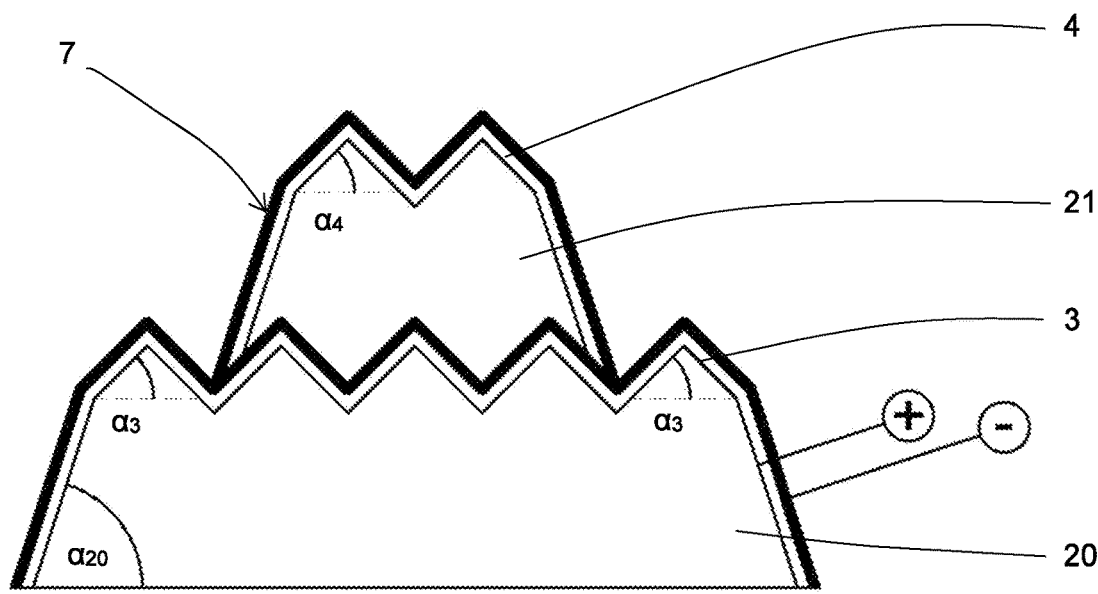
FIG. 20 shows a cross-section of the structure of a photovoltaic module using the structure according to the invention in the variant of FIG. 2.
Figure 21:
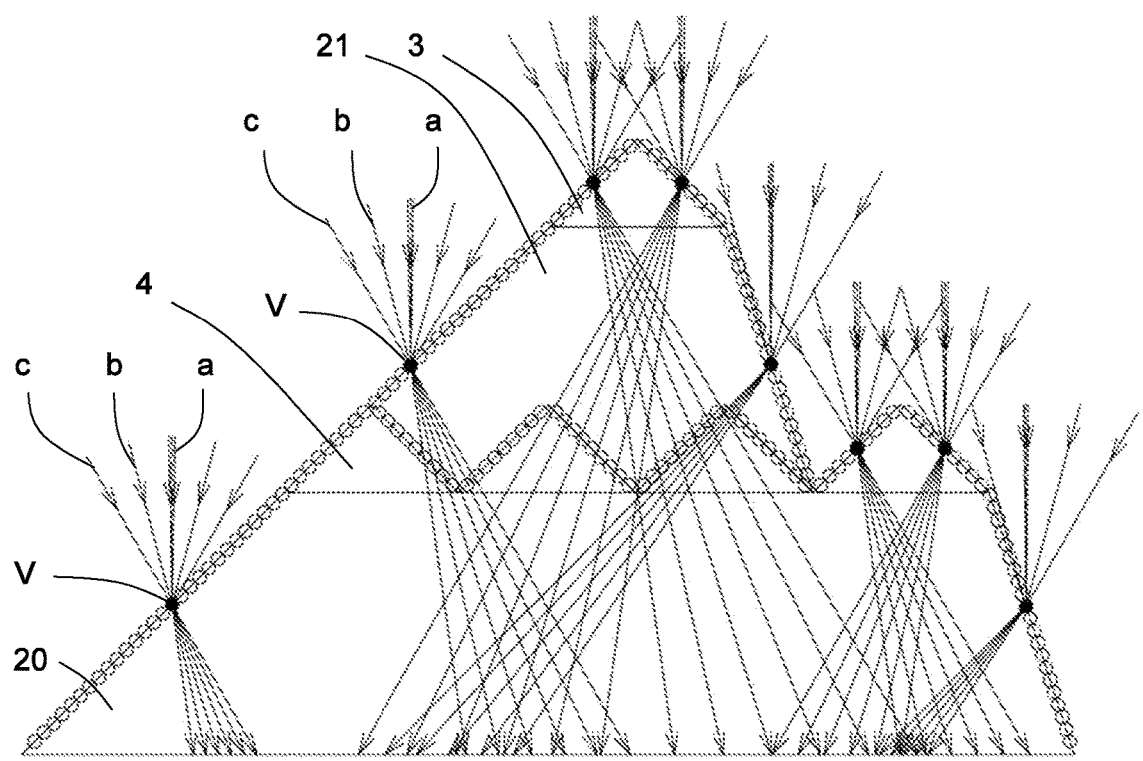
FIG. 21 shows the trajectories of photons of solar radiation incident on the surface of the structure of a photovoltaic module or a concentrator of solar radiation according to the invention in the variant of FIG. 15.

The structure 1 of a photovoltaic cell or a concentrator of solar radiation according to the invention serves either as a carrier for the photovoltaic cell/cells 7, which is/are mounted on its outer surface, constituting in combination with it/them a spatially shaped photovoltaic module—see FIG. 20, or it is made of optically permeable material, such as glass, transparent plastics, etc., and serves as a concentrator of solar radiation directing the solar radiation to the photovoltaic cell/module mounted below it. If it serves as a carrier for the photovoltaic cell/cells 7, its shape ensures that the solar radiation, whether direct, scattered or reflected, hits the photovoltaic cell/cells always at a suitable angle for maximum use. If it serves as a concentrator of solar radiation, its shape ensures that the solar radiation, whether direct, scattered or reflected, hitting any part of its surface will be always directed at a suitable angle towards the surface of the photovoltaic cell/cells 7 or module (not shown), arranged below the structure 1, even in the case of a very small angle of incidence—see FIG. 21, which shows the paths of photons of solar radiation incident on the surface of the structure 1 of a photovoltaic cell or a concentrator of solar radiation according to the invention in the embodiment according to FIG. 15.

Figure 22:
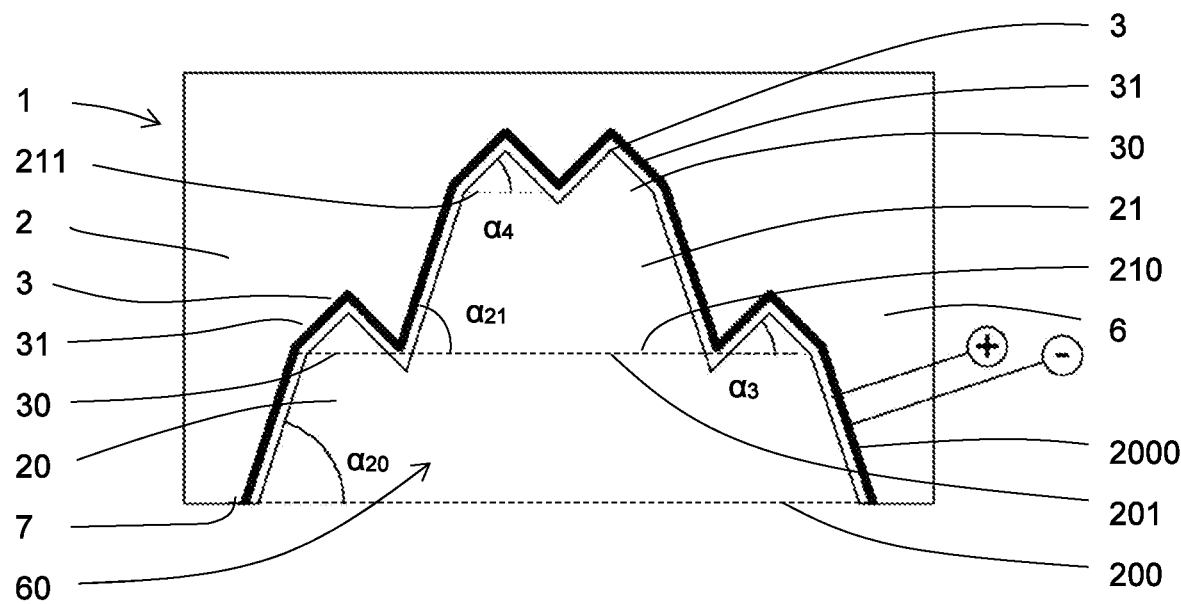
FIG. 22 shows a cross-section of another exemplary variant of the structure of a photovoltaic module or a concentrator of solar radiation according to the invention.
Figure 23:
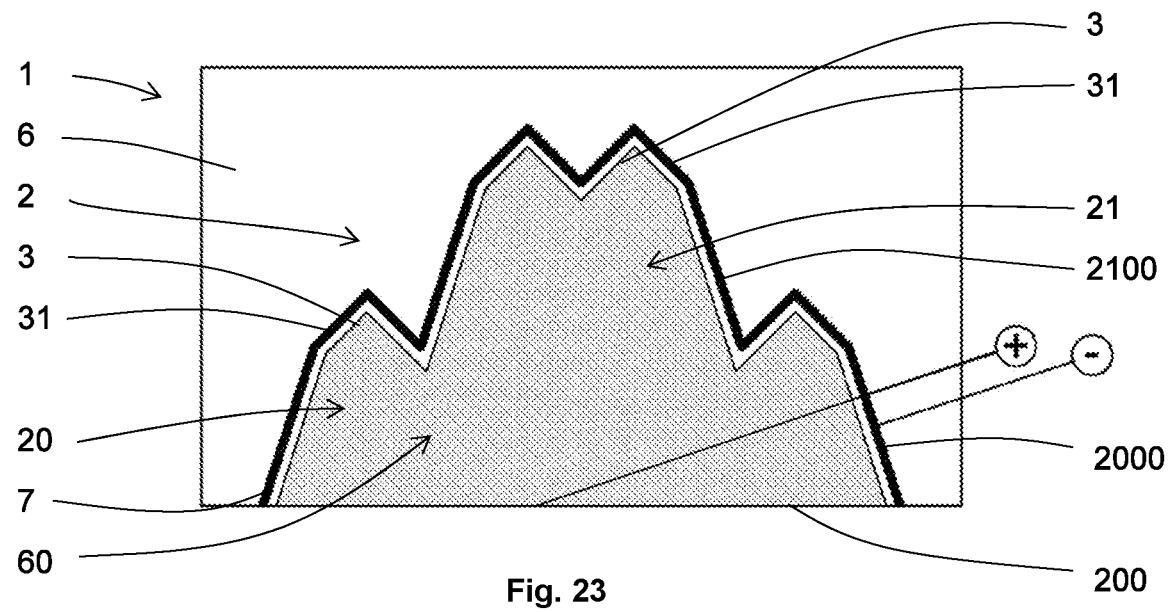
FIG. 23 shows a cross-section of an exemplary variant of the photovoltaic module according to the invention.

In the variant of embodiment shown in FIGS. 22 and 23, the structure 1 of a photovoltaic module or a concentrator of solar radiation is formed inversely, i.e., as a cavity 60 in a block 6 of optically permeable material. This optically permeable material serves as a concentrator of solar radiation towards the photovoltaic cell/cells 7 located in the cavity 60 or below it, or towards the photovoltaic cell/cells 7 located on the inner walls of the cavity 60. In the variant of embodiment shown in FIG. 22, the cathode matrix of the photovoltaic cell 7 is applied to the walls of the cavity 60; in the variant of embodiment shown in FIG. 23, it completely fills the cavity 60.

Figure 24:
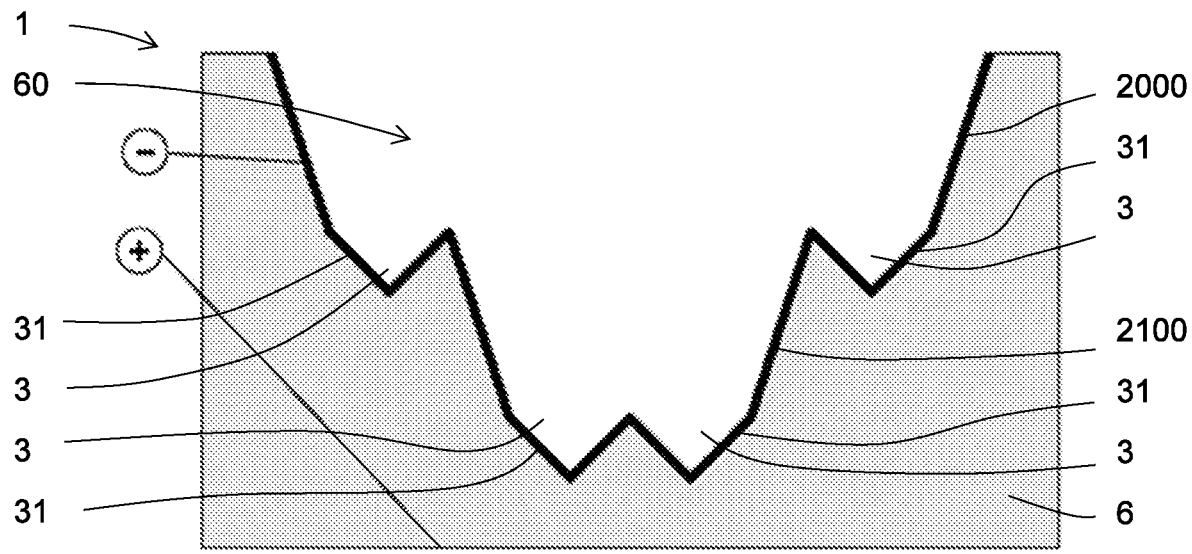
FIG. 24 shows a cross-section of another exemplary variant of the photovoltaic module according to the invention.

In the variant of embodiment shown in FIG. 24, the structure 1 of a photovoltaic module or an optical concentrator of solar radiation is formed inversely, i.e., as a cavity 60 in the block 6 of material, with the spatial arrangement being opposite to that of FIGS. 22 and 23.

Figure 24A:
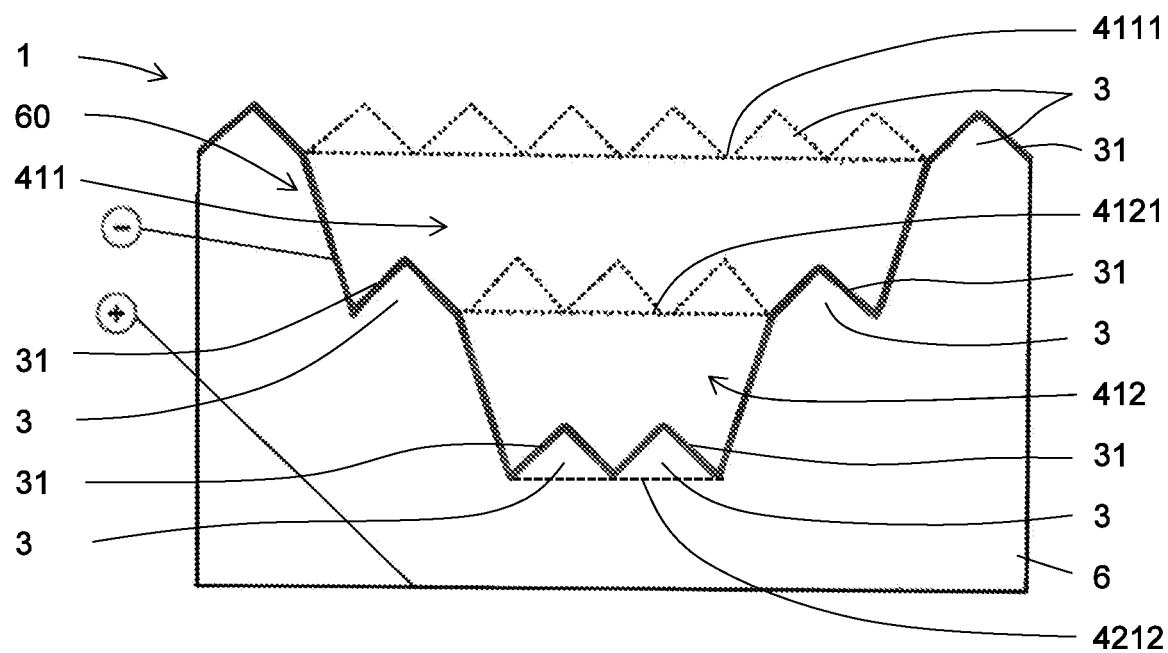
FIG. 24a shows a cross-section of yet another exemplary variant of the photovoltaic module according to the invention.

FIG. 24a shows another variant of the structure 1 of a photovoltaic module or an optical concentrator of solar radiation formed inversely as a cavity in the block 6 of material. This cavity 60 is formed by two (or even more in other variants) interconnected sub-recesses 411 and 412 in the shape of a truncated cone or pyramid, wherein the concentration projections 3 of any construction described above are arranged around the circumference of the top base 4111 of the upper sub-recess 411, around the circumference of the top base 4121 of the lower sub-recess 412 and on the bottom base 4122 of the lower sub-recess 412. In unillustrated variants of embodiment, the concentration projections 3 need not be arranged evenly around the circumference of the bases 4111, 4121, 4122 of the sub-recesses 411, 412. In analogous variants not shown, there can be any base 4111, 4121, 4122 of the sub-recess 411, 412 without concentration projections 3. In other unillustrated variants of embodiment, it is possible to combine concentration projections of any construction described above and recesses 4 of any construction described above on any base 4111, 4121, 4122 of the sub-recess 411, 412, or, when appropriate, to form only recesses 4 thereon.

Figure 25:
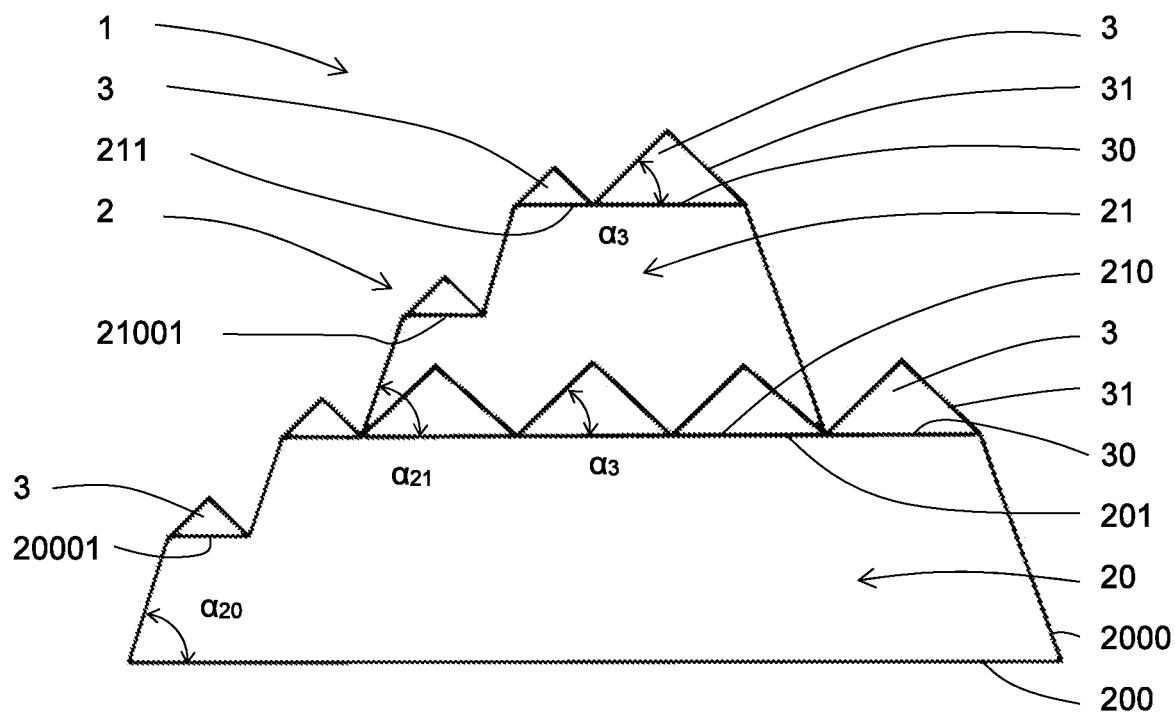
FIG. 25 shows another exemplary variant of the structure of a photovoltaic module or a concentrator of solar radiation according to the invention.
Figure 26:
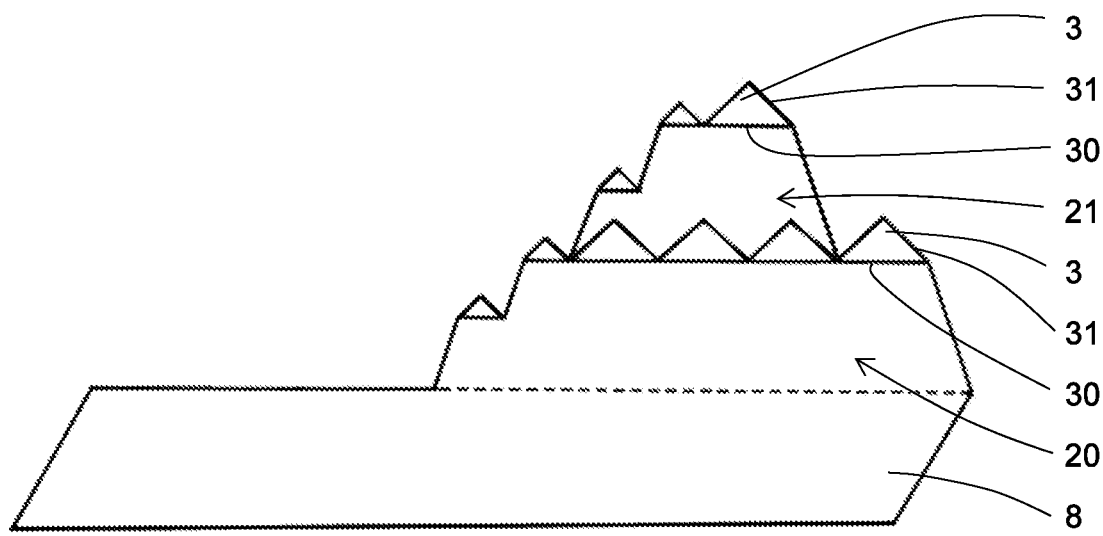
FIG. 26 shows another exemplary variant of the structure of a photovoltaic module or a concentrator of solar radiation according to the invention.
Figure 27:
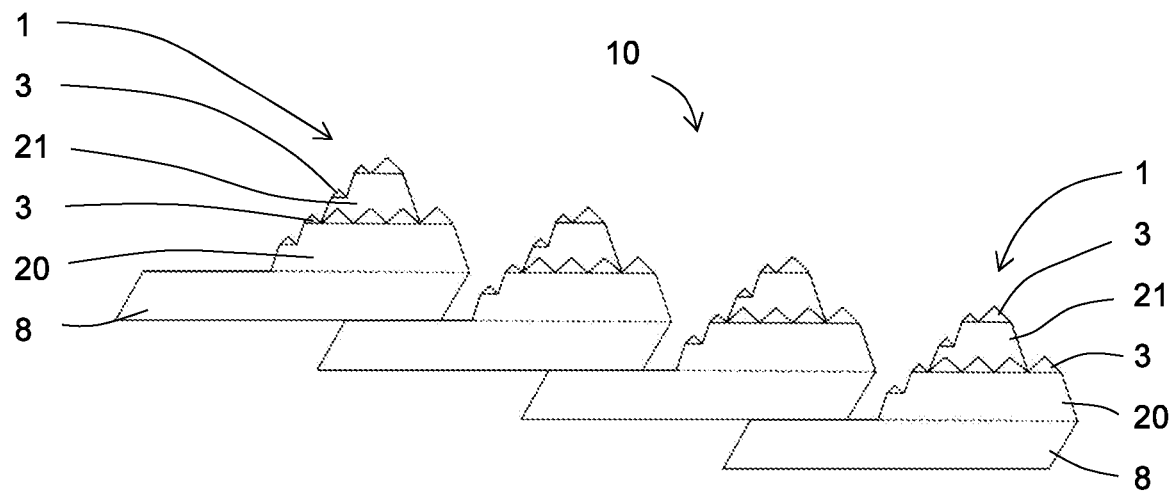
FIG. 27 shows an exemplary variant of a spatial combination of the structures of a photovoltaic module or a concentrator of solar radiation in the variant of FIG. 26.

Within one spatial structure 1 of a photovoltaic module or a concentrator of solar radiation according to the invention, concentration projections 3 of different sizes can be combined in any variant—see, e.g., FIG. 25, which shows the structure 1 of a photovoltaic module or an optical concentrator of solar radiation according to the invention, in which concentration projections 3 of different sizes are combined on the top bases 201, 211 of the individual truncated pyramids 20, 21 of the base body 2. In addition, in the illustrated variant of embodiment, at least one of the side walls 2010, 2100 of each truncated pyramid 21 is formed as broken, wherein other concentration projections 3 are provided on the transition surface 20001 or 21001 formed between its interconnected parts. In the illustrated variant of embodiment, the transition surfaces 20101, 21001 are parallel with the top base 211 or 201 of the given truncated cone 20, 21, but it is not a necessary condition—the transition surfaces 20001, 21001 may be oriented generally arbitrarily, wherein they may be also without concentration projections 3. In unillustrated variants, at least some transition surfaces 20001, 21001 are without concentration projections 3, or recesses 4, or combinations of the concentration projections 3 and recesses 4 can be formed in them. FIG. 26 shows a variant of the structure of a photovoltaic module or an optical concentrator of solar radiation according to the invention, in which the structure according to FIG. 25 is mounted on a supporting block 8 consisting of a prism with a parallelogram cross-section, wherein this prism extends over the width of the bottom base 200 of the lower truncated pyramid 20 and facilitates the assembly of the same or similar structures 1 into more complex spatial constructions 10—see, e.g., FIG. 27. A separate photovoltaic cell 7, or photovoltaic module (not shown) may be assigned to each structure 1 in this spatial construction 10, or, optionally, a common photovoltaic module may be assigned to several structures 1.

Figure 28:
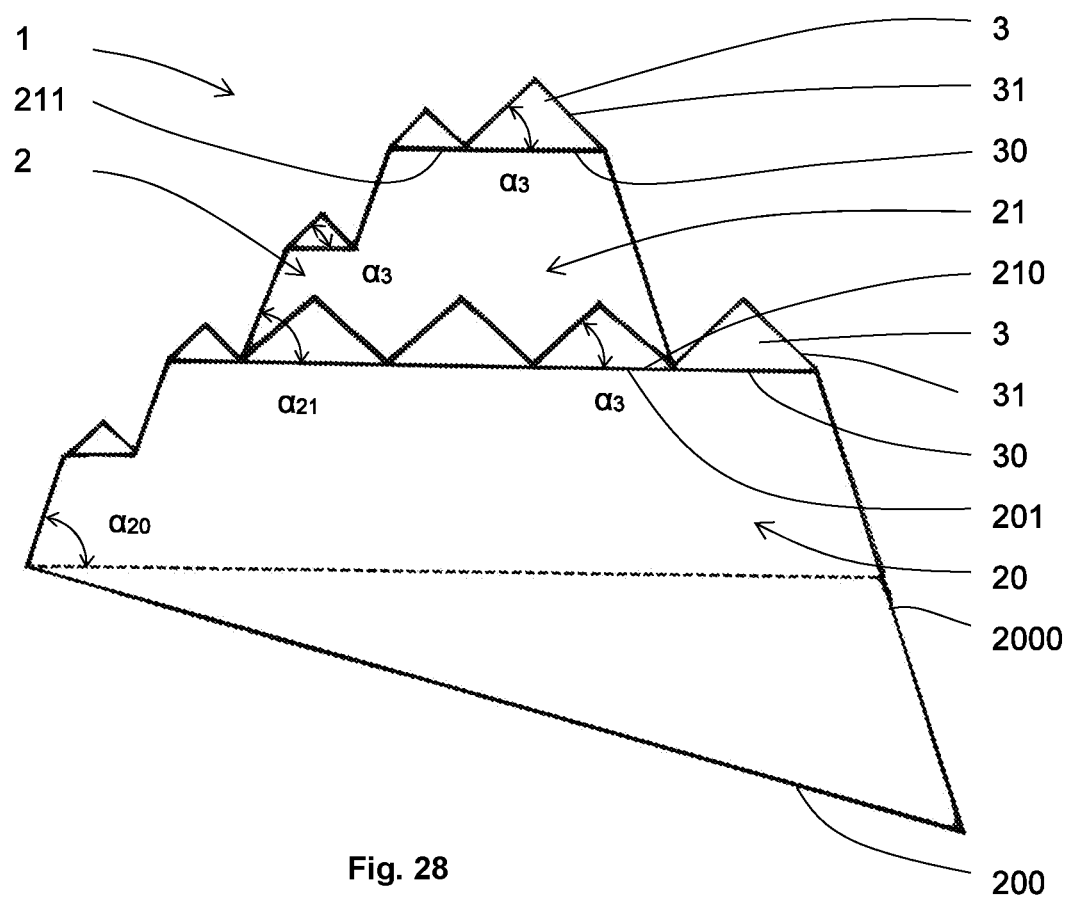
FIG. 28 shows another exemplary variant of the structure of a photovoltaic module or a concentrator of solar radiation according to the invention.

In all the above described and illustrated variants, the top base 210, or 211 of each truncated pyramid/cone 20, 21 of the base body 2 is always parallel with the bottom base 200, or 201 of this truncated pyramid/cone 20, 21. This, however, is not a necessary condition of the correct function of this structure 1. FIG. 28 shows a variant of the spatial structure 1 of a photovoltaic module or a concentrator of solar radiation, in which the bottom base 200 of the lower truncated pyramid 20 is inclined. In an unillustrated variant, it can be further concave or provided with other spatial shaping. This shape allows suitable assembly of these structures 1 into more complex structures 10, in which more of these structures 1 constituting, e.g., concentrators of solar radiation are assigned to one photovoltaic cell/module 7, while maintaining suitable orientation of the solar radiation onto its surface. An example of such a construction 10 is shown, for example, in FIG. 29. In this case, two structures according to FIG. 28 are arranged obliquely next to each other, abutting each other with their bottom bases 200 at the point of their lowest height. These structures 1 are arranged together with the photovoltaic cell/module 7 arranged below them in the supporting and/or protective construction 9 made of material permeable to solar radiation. In any variant of the spatial structure 1 of a photovoltaic module or a concentrator of solar radiation according to the invention, concentration projections 3 of different sizes and/or designs can be combined substantially arbitrarily.

Figure 30:
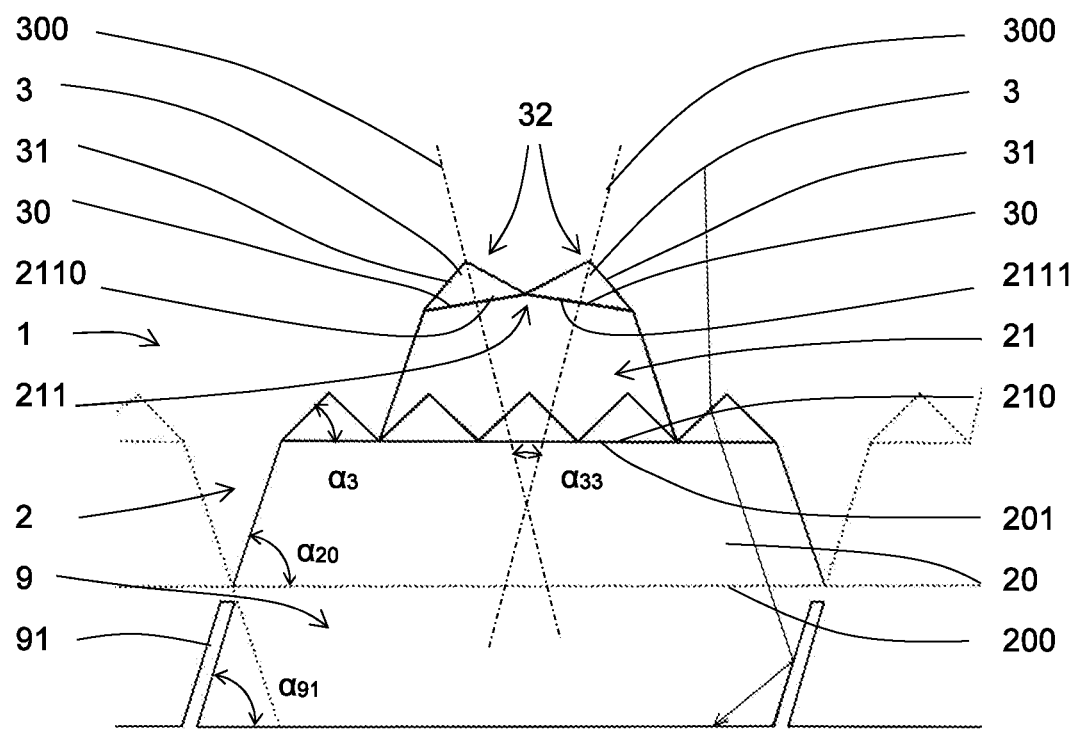
FIG. 30 shows a modified variant of an exemplary embodiment of the structure of a photovoltaic module or a concentrator of solar radiation according to the invention in the variant of FIG. 11.

In the case of the spatial structure 1 of a concentrator of solar radiation, it is advantageous if a platform 9 of material permeable to solar radiation is arranged below the bottom base 200 of the lower truncated pyramid or cone 20. This platform 9 allows a better spatial arrangement and further concentration of the paths of solar photons before they are incident on the photovoltaic cell 7 or module arranged below this platform 9. This platform 9 may be in its structure provided with elements for further concentration of the paths of photons of solar radiation. Such an element is, for example, a groove 91, or another inserted element, etc. On the wall of the groove 91, the path of solar photons is refracted, as shown in FIG. 30. The groove 91 is preferably oriented in the same way as one of the side walls 2000 of the lower truncated pyramid or cone 20 of the base body 2, being guided at an angle $\alpha_{91}=\alpha_{20}$. At the same time, the platform 9 can serve as a supporting element for a larger number of spatial structures 1—in FIG. 90 indicated by dots. In a preferred variant of embodiment, the thickness of the platform 9 is equal to the height of the lower truncated cone or pyramid 20 of the base body 2.

If necessary, any structure 1 can be supplemented by an active cooling system (using a suitable liquid coolant—see, e.g., FIG. 12) and/or a passive cooling system (using thermally conductive materials, e.g., in the form of metal elements—strips, plates, etc., arranged below the photovoltaic cell/cells 7).

LIST OF REFERENCES

1 spatial structure of a photovoltaic cell or a concentrator of solar radiation
10 spatial construction combining the structure of a photovoltaic cell or a concentrator of solar radiation
100 top base of the spatial construction
1000 middle base of the spatial construction
2 base body of the structure
20 lower truncated pyramid/cone
20a partial pyramid/cone constituting the lower truncated pyramid/cone
20b partial pyramid/cone forming the lower truncated pyramid/cone
200 bottom base of the lower truncated pyramid/cone
201 top base of the lower truncated pyramid/cone
2000 side wall of the lower truncated pyramid/cone
20001 transition surface
21 upper truncated pyramid/cone
210 bottom base of the upper truncated pyramid/cone
211 top base of the upper truncated pyramid/cone
2100 side wall of the upper truncated pyramid/cone
21001 transition surface
2110 inclined surface
2111 inclined surface
3 concentration projection
30 base of the concentration projection
300 axis of the concentration projection
31 wall of the concentration projection
301 lower truncated pyramid/cone of the concentration projection
3010 top base of the lower truncated pyramid/cone of the concentration projection
302 upper truncated pyramid/cone of the concentration projection
3020 bottom base of the upper truncated pyramid/cone of the concentration projection
32 apex of the concentration projection
4 recess
41 recess
411 sub-recess
4111 base of the sub-recess
412 sub-recess 4121 base of the sub-recess
4212 base of the sub-recess
5 chamfer
6 block of optically permeable material
60 cavity in the block of optically permeable material
7 photovoltaic cell
8 supporting block
9 platform
91 groove
N supporting and/or protective structure
$\alpha_{20}$ inclination angle of the lower truncated pyramid/cone
$\alpha_{200}$ inclination angle of the partial truncated pyramid/cone
$\alpha_{21}$ inclination angle of the upper truncated pyramid/cone as inclination angle of the concentration projection
$\alpha_{33}$ angle between the axes of the concentration projections
$\alpha_5$ chamfer angle
PI surface
PII surface

The invention claimed is:

1. A spatial structure of a photovoltaic module or of a concentrator of solar radiation, the spatial structure comprising:
a base body, the base body comprising an upper truncated pyramid having tapered sides or a truncated cone having a continuous tapered side, wherein the tapered sides or the continuous tapered side extend at an inclination angle between a bottom base and a top base of the upper truncated pyramid or cone, and a lower truncated pyramid having tapered sides or a truncated cone having a continuous tapered side, wherein the tapered sides or the continuous tapered side extend at an inclination angle between a bottom base and a top base of the lower truncated pyramid or cone, the upper truncated pyramid or cone arranged on the lower truncated pyramid or cone along a juncture line between the bottom base of the upper truncated pyramid or cone and the top base of the lower truncated pyramid or cone, an area of the bottom base of the upper truncated pyramid or cone at a plane of the juncture line being smaller than an area of a top base of the lower truncated pyramid or cone at the plane of the juncture line;
the inclination angle measured between the tapered sides of the lower truncated pyramid or the continuous tapered side of the lower truncated cone and the bottom base of the lower truncated pyramid or cone and the inclination angle measured between the tapered sides of the upper truncated pyramid or the continuous tapered side and the bottom base of the upper truncated pyramid or cone being in a range of 60 to 85°; and
at least one pyramid-shaped concentration projection having sides or a cone-shaped concentration projection having a continuous side and a base arranged on one or both of: the top base of the lower truncated pyramid or cone, or the top base of the upper truncated pyramid or cone, wherein an inclination angle measured between the sides or the continuous side and the base of the at least one concentration projection is in a range of 20 to 55°.

2. The spatial structure according to claim 1, wherein the inclination angle of the tapered sides or the continuous tapered side of the lower truncated pyramid or cone and the inclination angle of the tapered sides or the continuous tapered side of the upper truncated pyramid or cone are in the range of 65 to 75°.

3. The spatial structure according to claim 1, wherein the bottom base of the upper truncated pyramid or cone and the bottom base of the lower truncated pyramid have a shape of a regular n-sided polygon.

4. The spatial structure according to claim 3, wherein n is equal to 3, 4, 6, 8, 12, or 16.

5. The spatial structure according to claim 1, wherein the base of each concentration projection has a circular or oval shape or a shape of a regular n-sided polygon.

6. The spatial structure according to claim 5, wherein n is equal to 3, 4, 6, 8, 12, or 16.

7. The spatial structure according to claim 1, wherein in addition to the tapered sides or continuous tapered side of the lower truncated pyramid or cone and the tapered sides or continuous tapered side of the upper truncated pyramid or cone, the base body further comprises a continuous chamfer surface defined along an entire height of the base body from the bottom base of the lower truncated pyramid or cone to the top base of the upper truncated pyramid or cone, the chamfer surface having a continuous inclination angle of 20 to 80° measured between the chamfer surface and the bottom base of the lower truncated pyramid or cone.

8. The spatial structure according to claim 1, further comprising a recess having a shape of an inverted pyramid or cone formed in one or both of the top base of the lower truncated pyramid or cone or in the top base of the upper truncated pyramid or cone, the inverted pyramid or cone having sides or a continuous side extending at an inclination angle of 20 to 55° from the top base of the lower truncated pyramid or cone or the top base of the upper truncated pyramid or cone.

9. The spatial structure according to claim 1, comprising at least two oppositely inclined surfaces formed on the top base of the upper truncated pyramid or cone, wherein one of the at least one concentration projections is arranged on each of the oppositely inclined surfaces and respective axes of the concentration projections intersect and form an angle of 40 to 90° therebetween.

10. The spatial structure according to claim 1, wherein the spatial structure is made of an optically permeable material.

11. The spatial structure according to claim 1, further comprising at least one photovoltaic cell on a surface of the body.

12. The spatial structure according to claim 1, wherein at least one of the tapered sides or the continuous tapered side of one or both of the upper truncated cone or pyramid or the lower truncated cone or pyramid comprises a stepped profile having a transition surface defined in the at least one of the tapered sides or the continuous tapered side.

13. The spatial structure according to claim 12, comprising one of the at least one concentration projection arranged on the transition surface or a recess defined in the transition surface.

14. The spatial structure according to claim 1, further comprising a platform of optically permeable material arranged below the bottom base of the lower truncated pyramid or cone.

* * * * *